(12) United States Patent
Lemay et al.

(10) Patent No.: US 9,482,296 B2
(45) Date of Patent: Nov. 1, 2016

(54) RENDERING ROAD SIGNS DURING NAVIGATION

(71) Applicant: Apple Inc., Cupertino, CA (US)

(72) Inventors: Stephen O. Lemay, San Fracisco, CA (US); Seejo K. Pylappan, Cupertino, CA (US); Marcel van Os, San Francisco, CA (US); Harold O. Habeck, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 500 days.

(21) Appl. No.: 13/632,029

(22) Filed: Sep. 30, 2012

(65) Prior Publication Data

US 2014/0019036 A1 Jan. 16, 2014

Related U.S. Application Data

(60) Provisional application No. 61/699,754, filed on Sep. 11, 2012, provisional application No. 61/655,997, filed on Jun. 5, 2012, provisional application No. 61/656,032, filed on Jun. 6, 2012, provisional (Continued)

(51) Int. Cl.
*F16D 41/06* (2006.01)
*G01C 21/36* (2006.01)
(Continued)

(52) U.S. Cl.
CPC ............ *F16D 41/063* (2013.01); *G01C 21/32* (2013.01); *G01C 21/34* (2013.01); *G01C 21/3626* (2013.01); *G01C 21/3632* (2013.01);
(Continued)

(58) Field of Classification Search
CPC ............... G01S 21/3673; G01S 21/32; G01S 21/3632; G01S 21/3635; G01S 21/34; G01S 21/3626; G01S 21/3667; G06T 11/60
See application file for complete search history.

(56) References Cited

U.S. PATENT DOCUMENTS 5,459,667 A * 10/1995 Odagaki et al. .............. 701/428
5,654,892 A 8/1997 Fujii et al.
(Continued)

FOREIGN PATENT DOCUMENTS

EP 1788541 5/2007
EP 2080985 7/2009
(Continued)

OTHER PUBLICATIONS

Lawrence, Review: Sygic Mobile Maps 2009, Jul. 23, 2009, iPhonewzealand, retreived from http://www.iphonewzealand.co.nz/2009/all/review-sygic-mobile-maps-2009/ on Feb 26, 2015.*
(Continued)

*Primary Examiner* — Mussa A Shaawat
*Assistant Examiner* — Thomas Ingram
(74) *Attorney, Agent, or Firm* — Adeli LLP

(57) ABSTRACT

Some embodiments of the invention provide a navigation application that presents road signs during a navigation presentation. In presenting the road signs, the application of some embodiments differentiates the appearance of road signs at junctions that require a change of direction from road signs at junctions that do not require a change of direction. The application may perform processes that ensure that it arranges the road signs on the map in an aesthetically pleasing manner. In addition, the navigation application of some embodiments does not display too many road signs along the navigated route so that the route is not by occluded by too many road signs.

24 Claims, 16 Drawing Sheets

Related U.S. Application Data application No. 61/656,043, filed on Jun. 6, 2012, provisional application No. 61/657,864, filed on Jun. 10, 2012, provisional application No. 61/657,880, filed on Jun. 10, 2012, provisional application No. 61/699,851, filed on Sep. 11, 2012, provisional application No. 61/699,855, filed on Sep. 11, 2012.

(51) Int. Cl.
*G01C 21/32* (2006.01)
*G01C 21/34* (2006.01)
*G06T 11/60* (2006.01)
*F16D 41/063* (2006.01)

(52) U.S. Cl.
CPC ....... *G01C21/3635* (2013.01); *G01C 21/3667* (2013.01); *G01C 21/3673* (2013.01); *G06T 11/60* (2013.01)

(56) References Cited

U.S. PATENT DOCUMENTS

| | | | |
|---|---|---|---|
| 5,862,511 | A | 1/1999 | Croyle et al. |
| 5,878,368 | A | 3/1999 | DeGraaf |
| 6,029,111 | A | 2/2000 | Croyle |
| 6,163,269 | A | 12/2000 | Millington et al. |
| 6,178,380 | B1 | 1/2001 | Millington |
| 6,202,026 | B1 | 3/2001 | Nimura et al. |
| 6,295,503 | B1 | 9/2001 | Inoue et al. |
| 6,360,167 | B1 | 3/2002 | Millington et al. |
| 6,374,180 | B1 | 4/2002 | Slominski et al. |
| 6,480,783 | B1 | 11/2002 | Myr |
| 6,615,130 | B2 | 9/2003 | Myr |
| 7,054,742 | B2 | 5/2006 | Khavakh et al. |
| 7,194,356 | B2 | 3/2007 | Sano |
| 7,433,780 | B2 | 10/2008 | Machino |
| 7,437,279 | B2 | 10/2008 | Agrawala et al. |
| 7,542,882 | B2 | 6/2009 | Agrawala et al. |
| 7,551,172 | B2 | 6/2009 | Yaron et al. |
| 7,746,343 | B1 | 6/2010 | Charaniya et al. |
| 7,761,227 | B2 | 7/2010 | Kropp |
| 7,860,645 | B2 * | 12/2010 | Kim et al. ............. 701/423 |
| 8,237,713 | B2 | 8/2012 | Yaron et al. |
| 8,237,745 | B1 * | 8/2012 | Cornell et al. ............ 345/660 |
| 8,301,378 | B2 | 10/2012 | Nishibashi et al. |
| 8,306,730 | B2 | 11/2012 | Nishibashi et al. |
| 8,428,871 | B1 | 4/2013 | Matthews et al. |
| 8,738,284 | B1 * | 5/2014 | Jones ...................... 701/409 |
| 2001/0028350 | A1 | 10/2001 | Matsuoka et al. |
| 2004/0212627 | A1 | 10/2004 | Sumizawa et al. |
| 2004/0236507 | A1 | 11/2004 | Maruyama et al. |
| 2005/0137791 | A1 * | 6/2005 | Agrawala et al. ........... 701/209 |
| 2005/0143914 | A1 | 6/2005 | Yamada et al. |
| 2005/0243104 | A1 | 11/2005 | Kinghorn |
| 2006/0041372 | A1 | 2/2006 | Kubota et al. |
| 2006/0058949 | A1 | 3/2006 | Fogel et al. |
| 2006/0195257 | A1 * | 8/2006 | Nakamura .................. 701/211 |
| 2008/0208450 | A1 * | 8/2008 | Katzer ......................... 701/201 |
| 2008/0228393 | A1 * | 9/2008 | Geelen et al. .............. 701/208 |
| 2009/0063041 | A1 * | 3/2009 | Hirose et al. ............... 701/209 |
| 2009/0181650 | A1 * | 7/2009 | Dicke ...................... G01C 21/32 455/414.1 |
| 2009/0187335 | A1 * | 7/2009 | Muhlfelder et al. ......... 701/200 |
| 2009/0216434 | A1 * | 8/2009 | Panganiban et al. ........ 701/208 |
| 2010/0057358 | A1 | 3/2010 | Winer et al. |
| 2010/0123737 | A1 | 5/2010 | Williamson et al. |
| 2010/0153010 | A1 * | 6/2010 | Huang ........................ 701/210 |
| 2010/0225644 | A1 | 9/2010 | Swope, III et al. |
| 2010/0324816 | A1 | 12/2010 | Highstrom et al. |
| 2011/0098918 | A1 * | 4/2011 | Siliski et al. ................. 701/201 |
| 2011/0106439 | A1 | 5/2011 | Huang et al. |
| 2011/0196610 | A1 | 8/2011 | Waldman et al. |
| 2011/0291863 | A1 | 12/2011 | Ozaki et al. |
| 2012/0041674 | A1 | 2/2012 | Katzer |
| 2012/0143504 | A1 * | 6/2012 | Kalai et al. .................. 701/533 |
| 2012/0245849 | A1 * | 9/2012 | Spindler et al. ............. 701/533 |
| 2012/0259539 | A1 | 10/2012 | Sumizawa |
| 2012/0303263 | A1 * | 11/2012 | Alam et al. .................. 701/410 |
| 2012/0303268 | A1 | 11/2012 | Su et al. |
| 2013/0035853 | A1 | 2/2013 | Stout et al. |
| 2013/0162632 | A1 * | 6/2013 | Varga et al. ................. 345/419 |
| 2013/0191020 | A1 * | 7/2013 | Emani et al. ................ 701/468 |
| 2014/0156187 | A1 * | 6/2014 | Goddard ................ G01C 21/32 701/533 |

FOREIGN PATENT DOCUMENTS

| | | |
|---|---|---|
| JP | H11-38868 | 2/1999 |
| WO | WO 86/02764 | 5/1986 |
| WO | WO 2005/103624 | 11/2005 |
| WO | WO 2011/076989 | 6/2011 |

OTHER PUBLICATIONS

Unknown Author, Blaupunkt chooses NNG navigation software for new aftermarket product, May 24, 2011, telematicsnews.info, retrieved from http://telematicsnews.info/2011/05/24/blaupunkt-chooses-nng-navigation-software-for-new-aftermarket-product_my2241/ on Feb 26, 2015.*

Jake Gaecke, Appletell reviews Sygic Mobile Maps 2009North America for iPhone, Aug. 9, 2009, http://www.technologytell.com/apple/49215/appletell-reviews-sygic-mobile-maps-2009-north-america/.*

Author Unknown, "Google Maps Voice Navigation in Singapore," software2tech, Jul. 20, 2011, 1 page, available at http://www.youtube.com/watch?v=7B9JN7BkvME.

Author Unknown, "Tom Tom GO Live 1005 on the road Re-routing," PocketGPS, Mar. 8, 2012, 1 page, available at http://www.youtube.com/watch?v=sJf_NOcqoNA.

Author Unknown, "MAZDA: Navigation System—Owner's Manual", available at http://download.tomtom.com/open/manuals/mazda/nva-sd8110/Full_Manual_EN.pdf, Jan. 1, 2009, 159 pages.

Dube, Ryan, "Use Google Maps Navigation for Turn-By-Turn GPS [Android]", available at http://www.makeuseof.com/tag/google-maps-navigation-turnbyturn-gps-android/, Jun. 24, 2010, 7 pages.

* cited by examiner

RENDERING ROAD SIGNS DURING NAVIGATION

CLAIM OF BENEFIT TO PRIOR APPLICATIONS

This application claims the benefit of U.S. Provisional Application 61/655,997, filed Jun. 5, 2012; U.S. Provisional Application 61/656,032, filed Jun. 6, 2012; U.S. Provisional Application 61/656,043, filed Jun. 6, 2012; U.S. Provisional Application 61/657,864, filed Jun. 10, 2012; U.S. Provisional Application 61/657,880, filed Jun. 10, 2012; U.S. Provisional Application 61/699,754, filed Sep. 11, 2012; U.S. Provisional Application 61/699,851, filed Sep. 11, 2012; and U.S. Provisional Application 61/699,855, filed Sep. 11, 2012. U.S. Provisional Application 61/699,754 is incorporated herein by reference.

BACKGROUND

To date, many navigation devices have been sold to assist people to navigate a route between two locations. While such devices have proved to be very useful, their navigation presentations often are very stale and lack an elegant design that maximizes the data provided to the user during a presentation. As such, the presentations that these devices provide their users can, at times, lead to the users being confused and in some cases getting lost during the navigation presentations.

BRIEF SUMMARY

Some embodiments of the invention provide a navigation application that presents road signs during a navigation presentation. Such road signs provide some context for the navigation instructions, and help the user associate the instructions during navigation with the area that the user is navigating in the real world.

In some embodiments, the application differentiates the appearance of road signs at junctions that require a change of direction from road signs at junctions that do not require a change of direction. Also, in some embodiments, the application performs processes that ensure that it arranges the road signs on the map in an aesthetically pleasing manner. In addition, the navigation application of some embodiments does not display too many road signs along the navigated route so that the route is not by occluded by too many road signs.

To select the road signs for display, the navigation application in some embodiments categorizes the roads into multiple tiers. For instance, in some embodiments, the application categorizes all roads on the navigated route as tier 1, all roads that intersect or overlap with the navigated route as tier 2, all roads that intersect the tier 2 roads as tier 3, and all other roads as tier 4. The navigation application of other embodiments defines the road tiers differently. For example, the application in some embodiments categorizes roads that intersect the above mentioned tier 2 roads differently based on the distance of these roads to the navigated route, and/or based on the time it would take for the device to reach these roads from the navigated route. Accordingly, these embodiments categorize (1) all roads on the navigated route as tier 1, (2) all roads that intersect or overlap with the navigated route as tier 2, (3) roads that intersect the tier 2 roads as tier 3 when these roads are within a threshold distance of the navigated route and/or when these roads can be reached from the navigated route within a threshold time, (4) roads that intersect the tier 2 roads as tier 4 when these roads are not within a threshold distance of the navigated route and/or when these roads cannot be reached from the navigated route within a threshold time, and (5) all other roads as tier 5 roads. Still other embodiments use other mechanisms to categorize roads and/or have other number of tiers.

After categorizing the roads into several tiers, the application performs processes that ensure that it does not place too many road signs on or nearby the navigated route and that it places these road signs on the route in an aesthetically pleasing manner. Different embodiments perform these tasks differently. For instance, in some embodiments, the application uses a predetermined or user-defined maximum and minimum numbers of road signs that can appear in the device view at any given time. Based on these numbers and based on a preference for the lower tier roads, the application then identifies the roads for which it should show road signs. When there are too many tiers 1 and 2 road signs, the application in some embodiments gives a preference to road signs that are closer to the current location of the user and relate to the direction of travel of the user.

Several more detailed embodiments of the invention are provided below. Many of these examples refer to controls (e.g., selectable items) that are part of the navigation application. Also, in several of the examples below (such as those illustrated in FIGS. 1 and 3-12) the device on which the application executes has a touch screen through which a user can interact with the navigation application. However, one of ordinary skill in the art will realize that cursor controllers or other input devices can be used to interact with the controls and the application shown in these examples for other embodiments that execute on devices with cursors and cursor controllers or other input mechanisms (e.g., voice control).

The preceding Summary is intended to serve as a brief introduction to some embodiments as described herein. It is not meant to be an introduction or overview of all subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a navigation application that presents road signs during a navigation presentation. Such road signs provide some context for the navigation instructions, and help the user associate the instructions during navigation with the area that the user is navigating in the real world.

Figure 1:
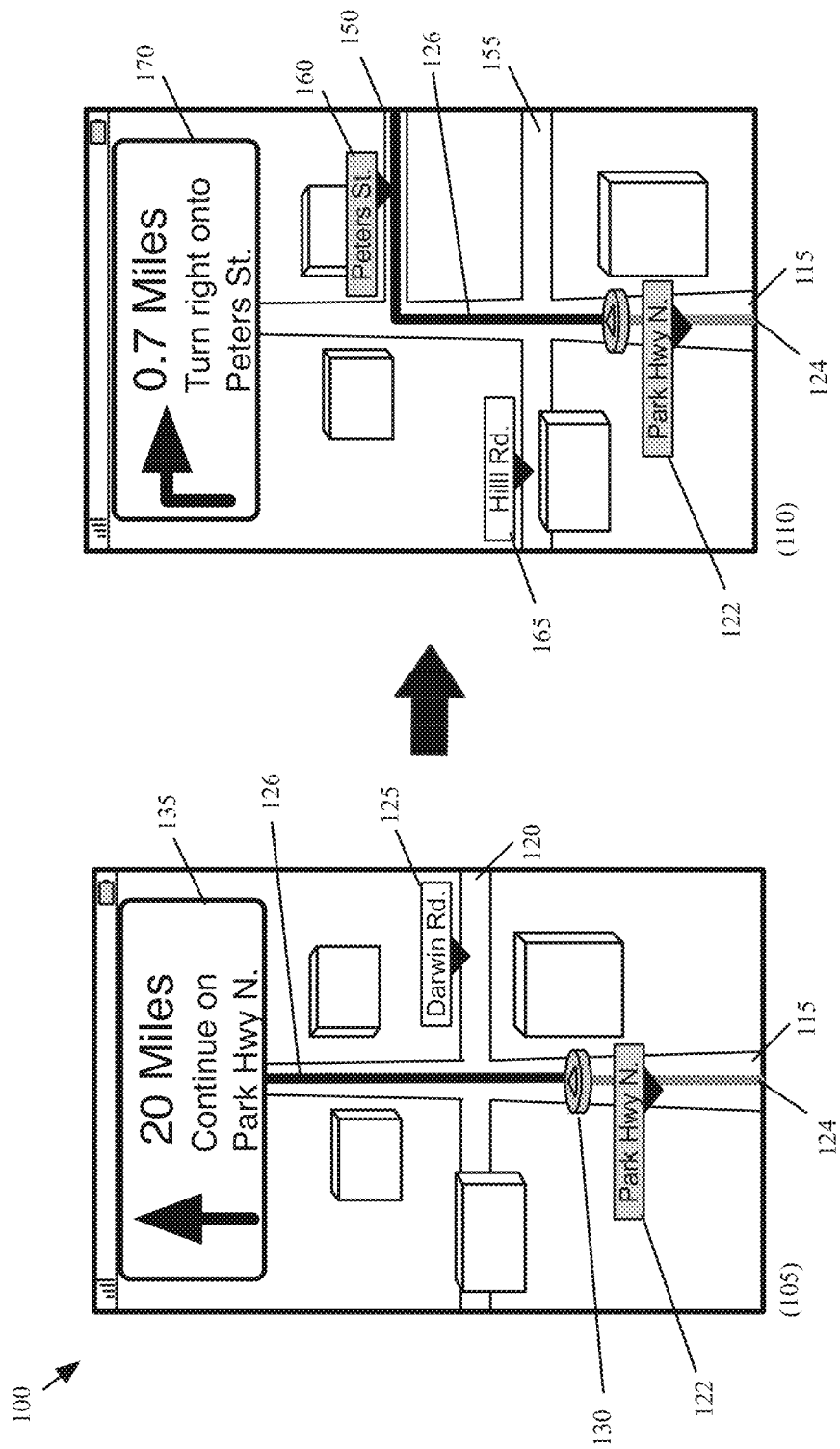
FIG. 1 illustrates an example of a navigation presentation with road signs for some embodiments of the invention.

FIG. 1 illustrates an example of a navigation presentation with such road signs for some embodiments of the invention. This figure illustrates the user interface (UI) 100 of a navigation application that is executing on a device to provide the navigation presentation. FIG. 1 illustrates the UI 100 during two stages 105 and 110 of operations that relate to two different portions of the navigation presentation that correlate to two different positions of the device along a navigated route. In both stages, the navigation presentation provides a three-dimensional (3D) perspective view of a portion of the navigated route.

The first stage 105 shows a first portion of the navigation presentation that displays two intersecting roads 115 and 120. The first road 115 is a road along the navigated route, as indicated by a graphical object 130 (which is a colored puck in this example), a first color line 124 that trails this object 130, a second color line 126 that leads this object, and a banner 135 that specifies the direction and remaining distance of travel along the first road. The second road 120 is a road that is not along the navigated route, but intersects the first road 115 along this route.

A road is "along" a navigate route when the device has to traverse along that road in the direction of travel along that road. Hence, the second road 120 is not a road along the navigated route because the puck 130 is never supposed to travel along this road in the direction of travel of this road. If the device has to re-specify the navigated route (e.g., in response to the user making an incorrect turn along the previous navigated route), a road that was not along the previously specified navigated route might end up along the newly specified navigate route.

The first stage 105 also shows two road signs 122 and 125 for these two roads 115 and 120. Both road signs are presented by the application as vertically standing objects in the 3D perspective navigation scene that the application is presenting. This vertical appearance is meant to simulate vertically standing road signs in the real world that the user passes along the navigated route. In some embodiments, the application augments the realistic look of such road signs by generating and displaying shadows for these road signs in the 3D scene, and/or by making the appearance of these road signs similar or identical to their appearance or expected appearance in the real world. Also, in some embodiments, the road signs are not made to look perfectly vertical in the 3D scene, but rather are made to look practically vertical, e.g., to be within a particular angle (e.g., 0 to 45 degrees) of such a vertical alignment.

The first stage 105 further shows that the application in some embodiments differentiates the appearance of road signs at junctions along the navigated route that require a change of direction from road signs at junctions along the route that do not require a change of direction. Specifically, in this example, the first and second road signs are presented in different colors because the first road sign 122 is for a road along the navigated route, while the second road sign 125 is for a road that intersects the navigated route but is not along the navigated route. While FIG. 1 and other figures in this document differentiate road signs for junctions along the navigated route from road signs at junctions not along the navigated route by using different colors for such roads, one of ordinary skill will realize that the navigation application of other embodiments use other techniques to differentiate the appearance of such road signs. Examples of such other techniques include making some or all road signs for junctions along the navigated route blink (e.g., blinking the road sign for the next maneuver junction), using different fonts for the road signs for junctions along the navigated route, using different styles of signs for the road signs for junctions along the navigated route, etc.

The second stage 110 shows a different portion of the navigation presentation. In this portion, two new roads 150 and 155 are intersecting the first road 115. The road 150 is a road along the navigated route, as indicated (1) by the road sign 160 having the same color as the road sign 122 for the first road 115 that the puck 130 is currently traversing, and (2) by the second color line 126 that leads this object through the road 150, and (3) by a banner 170 that specifies the right turn from the road 115 onto the road 150. The road 155 is a road that is not along the navigated route, but intersects the first road 115 along this route.

The second stage 110 also shows three road signs 122, 160 and 165 for these three roads 115, 150 and 155. As before, each of these road signs is presented by the application as vertically standing objects in the 3D perspective navigation scene that the application is presenting. However, while the first and second road signs 122 and 160 have the same color appearance, the third road sign 165 at this stage has a different color appearance to signify that it is a sign for a road that is not along the navigated route.

In addition to differentiating the appearance of road signs at junctions along the route from road signs at junctions not along the navigated route, the application of some embodiments performs operations to ensure that it arranges the road signs on the map in an aesthetically pleasing manner, and to ensure that it does not display too many road signs along the navigated route so as not to occlude the route with too many road signs. To ensure that it does not display too many road signs, the application in some embodiments performs a categorization operation that ranks the roads into tiers.

Figure 2:
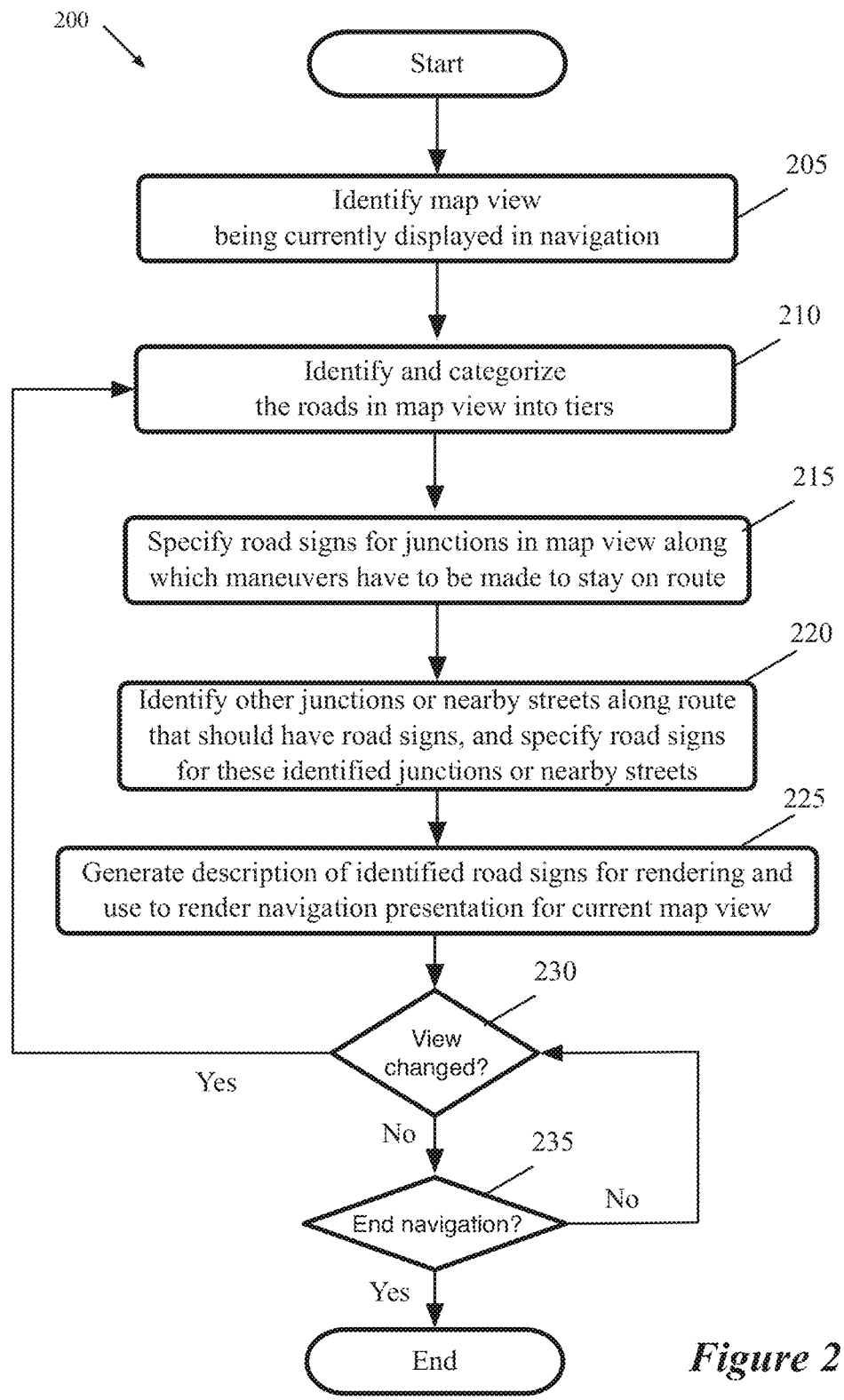
FIG. 2 presents a process that some embodiments use to present road signs.

FIG. 2 presents a process 200 that conceptually illustrates some of these operations. This process starts in some embodiments when the navigation application is directed to start a navigation presentation to provide navigation instructions to allow a user to navigate between two locations. As shown in FIG. 2, the process initially identifies (at 205) the map view that is to be displayed at the start of the navigation presentation. This view specifies a two or three dimensional scene that the process will have to render to generate the navigation presentation. In some embodiments, this scene will include roads, road signs, the graphical representation 130 of the device's current location, the trailing and leading road lines for indicating the direction of the past and future navigation, and a banner for providing navigation instructions. This scene also might include buildings and other constructs in the scene. In some embodiments, the process analyzes and renders a map view that is larger than the view that it can display on the screen at any given time in order to minimize latency for generation of surrounding areas as the user navigates to those areas.

After identifying the map view for generation, the process identifies (at 210) the roads in this map view and categorizes these roads into tiers. As mentioned below, the navigation application in some embodiments categorizes the roads into tiers in order to select the road signs for display. In some embodiments, the process categorizes all roads on the navigated route as tier 1, all roads that intersect or overlap with the navigated route as tier 2, all roads that intersect the tier 2 roads as tier 3, and all other roads as tier 4. The process 200 in other embodiments defines the road tiers differently. For example, the process in some embodiments categorizes roads that intersect the above mentioned tier 2 roads differently based on the distance of these roads to the navigated route, and/or based on the time it would take for the device to reach these roads from the navigated route. Accordingly, these embodiments categorize (1) all roads on the navigated route as tier 1, (2) all roads that intersect or overlap with the navigated route as tier 2, (3) roads that intersect the tier 2 roads as tier 3 when these roads are within a threshold distance of the navigated route and/or when these roads can be reached from the navigated route within a threshold time, (4) roads that intersect the tier 2 roads as tier 4 when these roads are not within a threshold distance of the navigated route and/or when these roads cannot be reached from the navigated route within a threshold time, and (5) all other roads as tier 5 roads. Still other embodiments use other mechanisms to categorize roads and/or have other number of tiers.

After categorizing the roads into several tiers, the process specifies (at 215) road signs along the navigation route for junctions where the user has to make a maneuver to stay on the navigation route. In some embodiments, the process might not specify road signs for all such junctions if there are more than a predetermined or user-specified number of such signs visible in the current map view, as too many such signs might occlude the map view too much. In such case, the process in some embodiments provides a preference for road signs for maneuver junctions that are closer to the current position of the user.

Next, at 220, the process identifies other junctions or nearby streets along the route that should have road signs based on the road tiers that it identified at 210. In some embodiments, the process performs this operation by ensuring that it does not place too many road signs on or nearby the navigated route. Different embodiments perform these tasks differently. For instance, in some embodiments, the process uses a predetermined or user-defined maximum and minimum numbers of road signs that can appear in the view at any given time. Based on these numbers and based on a preference for the lower tier roads, the application then identifies the roads and/or junctions for which it should show road signs. As mentioned above, the application in some embodiments gives a preference to road signs that are closer to the current location of the user and relate to the direction of travel of the user, when there are too many road signs of the same category and the process needs to use this category of road signs.

At 220, the process also specifies a road sign for each of the junctions and/or streets that it identifies at 220. The process in some embodiments differentiates the appearance of these road signs from the road signs along the route that it specified at 215. Also, in addition to differentiating signs for tier 1 roads from other tiered roads, the process in some embodiments differentiates the appearance of signs of other tiered roads from each other, e.g., differentiate signs for tier 2 roads form tier 3 roads. Other embodiments, however, do not do this because having more than two different types of road signs might be distracting in the navigation presentation.

At 220, the process further specifies a location for each road sign identified at 215 and 220, to display the road sign. In some embodiments, the process defines (at 220) places for these road signs along the route in order to enhance the aesthetic distribution and appearance of these road signs. The process performs this task of distributing the road signs differently in different embodiments. In some embodiments, the process starts from the direction of travel of the user along the navigation route, iterates through the succeeding identified road signs for display, and if possible places each road sign in each iteration on a different side of the navigated route, in order to distribute evenly the road signs about the navigated route as much as possible.

After 220, the process supplies (at 225) the road signs that it defined at 215 and 220 to one or more modules responsible for defining the description of these signs for rendering. This description is then used to render the navigation presentation for the current map view to include the road signs, other roads and other constructs in the map view.

Next, at 230, the process determines whether the navigation presentation should display a new view of the map. This is the case when the device is moving to a new location for which a new portion of the navigation presentation has to be generated. If the view has changed, the process returns to 210 to repeat operations 210-225 for this view. Otherwise, the process determines (at 235) whether the navigation has ended. If not, the process returns to 230. Otherwise, the process ends.

Many more examples of presenting road signs are described below. However, before describing these examples, an exemplary navigation application will now be described in section I. Section II then describes several example considerations that can factor into how the navigation application of some embodiments generates the road signs will now be described. Section III then describes an example process for labeling a navigation presentation. Section IV then describes electronic devices that employ the navigation application of some embodiments. Section V lastly describes location services used by some embodiments of the invention.

I. Navigation Application

Several more detailed examples of dynamically presenting road signs are described below. However, before describing these examples, an exemplary navigation application will now be described by reference to FIGS. 3-5.

A. User Interface

The navigation application of some embodiments is part of an integrated mapping application that includes several useful modalities, including location browsing, map searching, route identifying and route navigating operations. This integrated application (referred to below as the mapping application, the navigation application or the integrated application) in some embodiments identifies the location of the device using the coordinates in the GPS signal that the device receives at the location of the device. Alternatively or conjunctively, the mapping application uses other methods (e.g., cell tower triangulation) to compute the current location.

The mapping application of some embodiments is defined to be executed by a device that has a touch-sensitive screen that displays the output of the application. In some embodiments, this device has a multi-touch interface for allowing a user to provide touch and gestural inputs through the screen to interact with the application. Examples of such devices are smartphones (e.g., iPhone® sold by Apple Inc., phones operating the Android® operating system, phones operating the Windows 8® operating system, etc.).

Figure 3:
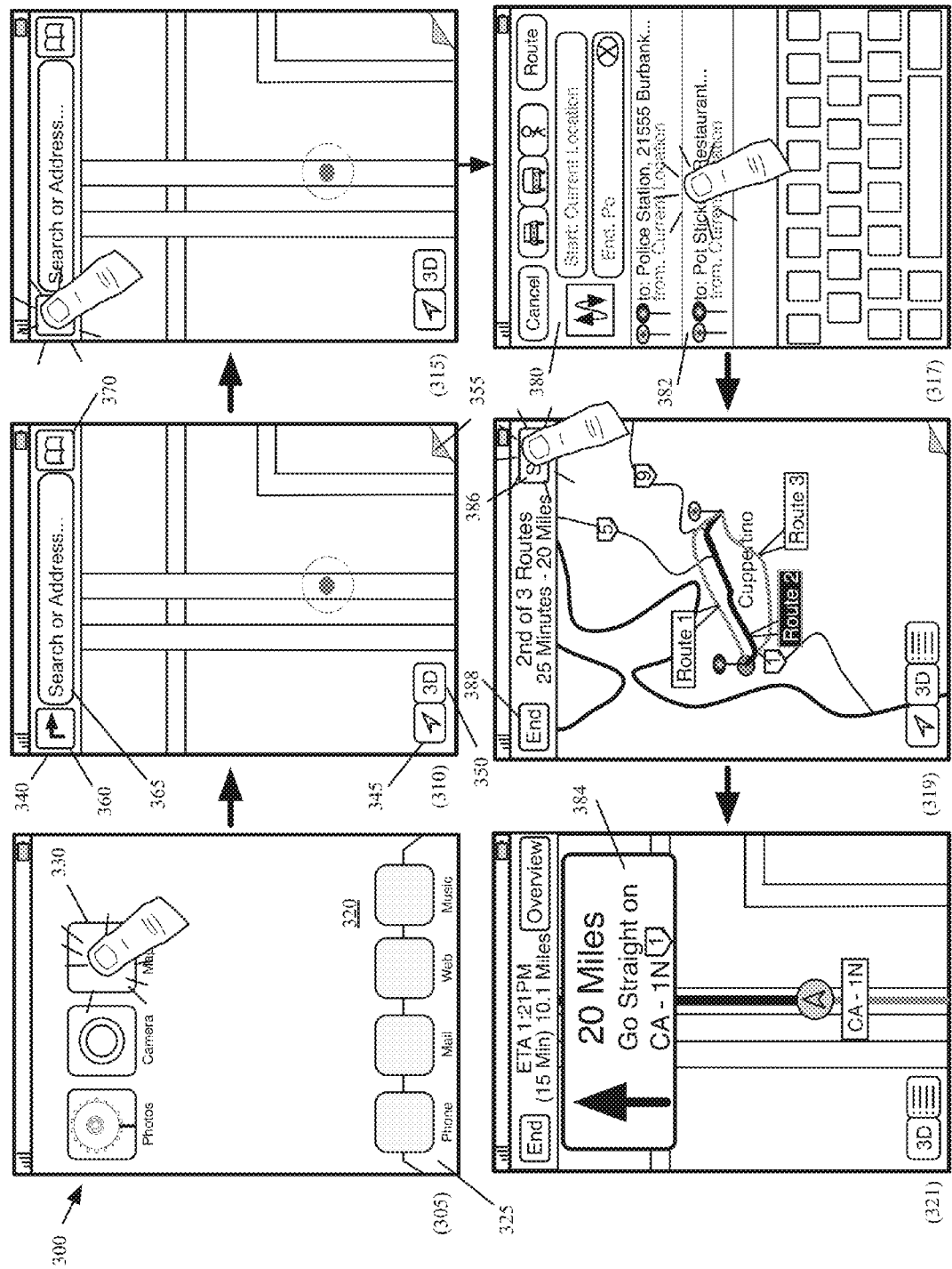
FIG. 3 illustrates an example of a device that executes an integrated mapping application of some embodiments of the invention.

FIG. 3 illustrates an example of a device 300 that executes an integrated mapping application of some embodiments of the invention. This figure also illustrates an example of launching a route navigation in this application. This application has a novel user interface (UI) design that seamlessly and cohesively integrates the controls for each of its different modalities by using a minimum set of on-screen controls that floats on top of the content in order to display as much of the content as possible. Additionally, this cluster adapts to the task at hand, adjusting its contents in an animated fashion when a user moves between the different modalities (e.g., between browsing, searching, routing and navigating). This common element with an adaptive nature enables the mapping application to optimize for different tasks while maintaining a consistent look and interaction model while moving between those tasks.

FIG. 3 shows six stages 305, 310, 315, 317, 319, 321 of interaction with the mapping application. The first stage 305 shows device's UI 320, which includes several icons of several applications in a dock area 325 and on a page of the UI. One of the icons on this page is the icon for the mapping application 330. The first stage shows a user's selection of the mapping application through touch contact with the device's screen at the location of this application on the screen.

The second stage 310 shows the device after the mapping application has opened. As shown in this stage, the mapping application's UI has a starting page that in some embodiments (1) displays a map of the current location of the device, and (2) several UI controls arranged in a top bar 340, and as floating controls. As shown in FIG. 3, the floating controls include an indicator 345, a 3D control 350, and a page curl control 355, while the top bar 340 includes a direction control 360, a search field 365, and a bookmark control 370.

In some embodiments, a user can initiate a search by tapping in the search field 365. This directs the application to present an animation that (1) presents an on-screen keyboard and (2) opens a search table full of invaluable completions. This table has some important subtleties. When the search field is tapped and before the terms are edited, or when the search field is empty, the table contains a list of "recents," which in some embodiments are recent searches and route directions that the user has requested. This makes it very easy to quickly bring up recently accessed results.

After any edit in the search field, the table is filled with search completions both from local sources (e.g., bookmarks, contacts, recent searches, recent route directions, etc.) and from remote servers. The incorporation of the user's contact card into the search interface adds additional flexibility to the design. When showing recents, a route from current location to the user's home is always offered in some embodiments, while it is offered in the contexts that are deemed to be "appropriate" in other embodiments. Also, when the search term is a prefix of an address label (e.g. 'Wo' for 'Work'), the application presents the user's labeled address as a completion in the search table in some embodiments. Together, these behaviors make the search UI a very powerful way to get results onto a map from a variety of sources. In addition to allowing a user to initiate a search, the presence of the text field in the primary map view in some embodiments also allows users to see the query corresponding to search results on the map and to remove those search results by clearing the query.

The bookmark control 370 (e.g., button) allows locations and routes to be bookmarked by the application. The position indicator 345 allows the current position of the device to be specifically noted on the map. Once this indicator is selected once, the application maintains the current position of the device in the center of the map. In some embodiments, it can also identify the direction to which the device currently points.

The 3D control 350 is a control for viewing a map or inspecting a route in three dimensions (3D). The mapping application provides the 3D control as a quick mechanism of getting into and out of 3D. This control also serves as (1) an indicator that the current view is a 3D view, and (2) an indicator that a 3D perspective is available for a given map view (e.g., a map view that is zoomed out might not have a 3D view available).

The page curl control 355 is a control that allows the application to minimize the number of on-screen controls, by placing certain less frequently used actions in a secondary UI screen that is accessible through the "page curl" control that is displayed on the map. In some embodiments, the page curl is permanently displayed on at least some of the map views that the application provides. For instance, in some embodiments, the application displays the page curl permanently on the starting page (illustrated in second stage 310) that it provides for allowing a user to browse or search a location or to identify a route.

The direction control 360 opens a direction entry page 380 through which a user can request a route to be identified between a starting location and an ending location. The third stage 315 of FIG. 3 illustrates that the selection of the direction control 360 opens the direction entry page 380, which is shown in the fourth stage 317. The direction control is one of three mechanisms through which the mapping application can be directed to identify and display a route between two locations; the two other mechanisms are (1) a control in an information banner that is displayed for a selected item in the map, and (2) recent routes identified by the device that are displayed in the search field 365. Accordingly, the information banner control and the search field 365 are two UI tools that the application employs to make the transition between the different modalities seamless.

The fourth stage 317 shows that the direction entry page 380 includes starting and ending fields for providing starting and ending locations for a route, and a table that lists recent routes that the application has provided to the user. Other controls on this page are controls for starting a route, for reversing the order of the start and end locations, for canceling the direction request, for picking walking, auto, or public transit routes. These controls and other aspects of the mapping application are described in U.S. Provisional Patent Application 61/699,851, entitled "Voice Instructions During Navigation", filed Sep. 11, 2012, which is incorporated herein by reference. These controls and other aspects of the mapping application are also described in U.S. patent application Ser. No. 13/632,121, now published as U.S. Patent Publication No. 2013/0322634, entitled "Context-Aware Voice Guidance"; this concurrently filed U.S. patent application is incorporated herein by reference.

The fourth stage 317 illustrates the user selecting one of the recent directions that was auto-populated in the table 382. The fifth stage 319 then shows three routes on a 2D map view between the specified start and end locations specified through the page 380. It also shows the selection of the second route and some information about this route in a bar at the top of the layout. This bar is shown to include start and end buttons 386 and 388. The start button 386 is shown to be selected in the fifth stage 319.

As shown by the sixth stage 321, the selection of the start button directs the application to enter a turn-by-turn navigation mode (e.g., starts the navigation presentation). In this example, the application has entered a 2D turn-by-turn navigation mode. In other embodiments, the application will enter by default into a 3D turn-by-turn navigation mode. In this mode, the application displays a realistic sign 384 that identifies the distance to the next juncture maneuver in the navigated route and some other pertinent information. The application also displays a top bar that includes some information about the navigation as well as End and Overview buttons, for respectively ending the navigation and obtaining an overview of the remaining portion of the navigated route or the entire portion of the navigated route in other embodiments.

The application further displays the floating 3D control and the floating list control, which were described above. It should be noted that the list control was adaptively added to the floating control cluster upon entering the route inspection and route navigation modalities, while the position indicator was removed from the floating control upon entering the route navigation modality. Also, upon transition from the route inspection mode to the route navigation mode, the application performs an animation in some embodiments that involves the page curl uncurling completely before the application transitions into the navigation presentation.

In some embodiments, the animation transition includes removing the top bar, its associated controls and the floating controls from the navigation presentation, and moving the sign 384 to the top edge of the presentation a short time period after starting the navigation presentation. As further described below, the application requires the user to tap on the navigated map to bring back the top bar, its controls and the floating controls, and requires another tap to remove these controls again from the map, in some embodiments. Other embodiments provide other mechanisms for viewing and removing these controls.

B. 2D and 3D Navigation

Figure 4:
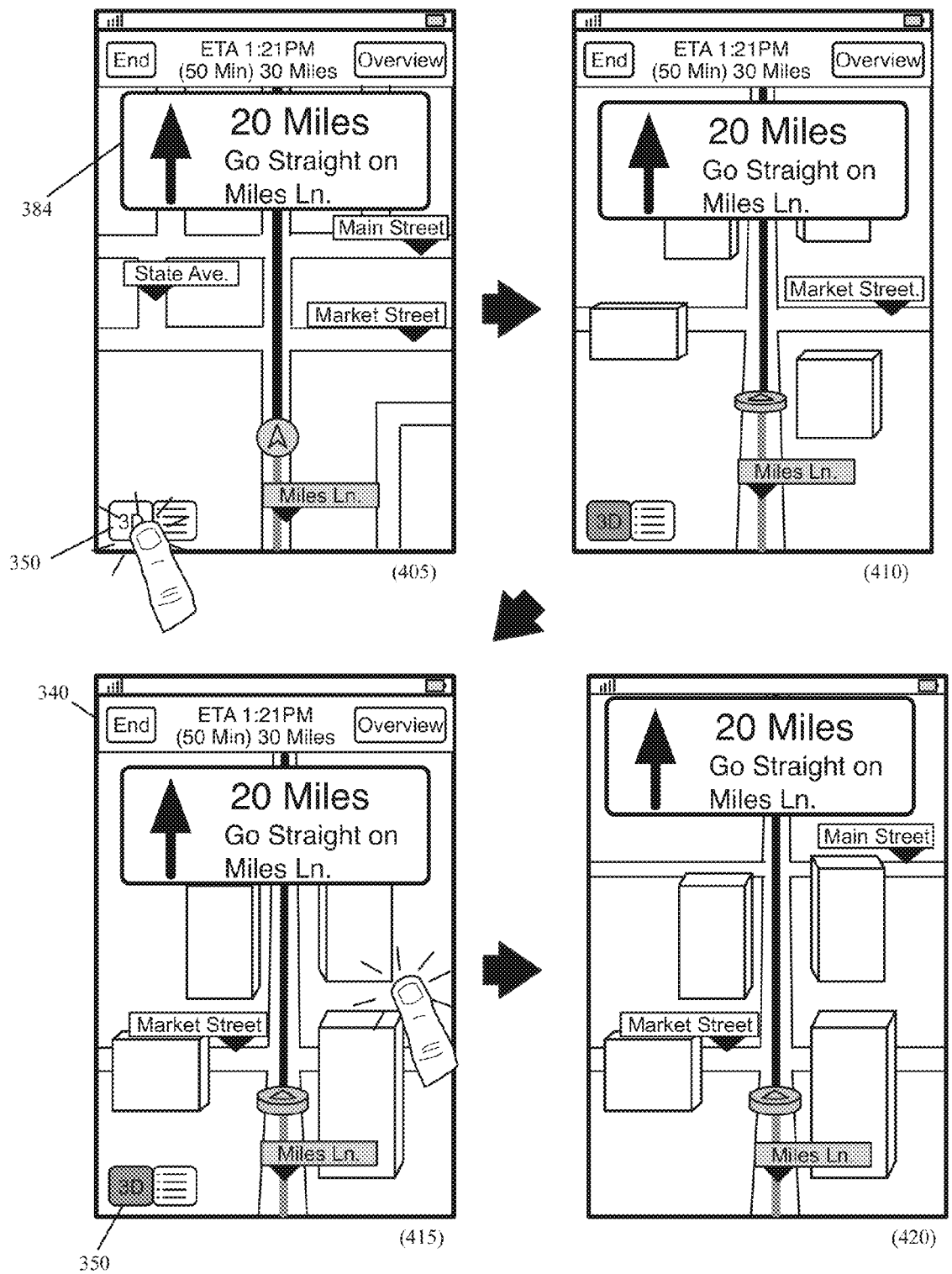
FIG. 4 illustrates how the navigation application of some embodiments provides a 3D control as a quick mechanism of entering a 3D navigating mode.

The navigation application of some embodiments can display a navigation presentation in either a 2D mode or a 3D mode. As mentioned above, one of the floating controls is the 3D control 350 that allows a user to view a navigation presentation in three dimensions (3D). FIG. 4 illustrates how the navigation application of some embodiments provides the 3D control 350 as a quick mechanism of entering a 3D navigating mode. This figure illustrates this operation in four operational stages 405-420. The first stage 405 illustrates the user selecting the 3D control 350 while viewing a two-dimensional navigation presentation.

The second stage 410 illustrates the navigation presentation in the midst of its transition into a 3D presentation. As shown in this figure, the 3D control appears highlighted at this stage to indicate that the navigation presentation has entered a 3D mode. As mentioned above, the navigation application generates the 3D view of the navigated map in some embodiments by rendering the map view from a particular position in the three dimensional scene that can be conceptually thought of as the position of a virtual camera that is capturing the map view. This rendering will be further described below by reference to FIG. 5.

The third stage 415 then illustrates the navigation presentation at the end of its transition into its 3D appearance. As shown by the difference between the heights of the buildings in the second and third stages, the transition from 2D to 3D navigation in some embodiments includes an animation that shows three-dimensional objects in the navigated map becoming larger.

The third stage 415 illustrates the user selecting the navigation presentation. As shown in the fourth stage 420, the selection resulted in the navigation application entering a full-screen mode. In this mode, the top bar 340 and the floating controls, including 3D control 350, are not shown. As such, the application displays the 3D map of the current location without obscuring with different user interface items. Here, the user can reselect the navigation presentation to exit the full-screen mode.

C. Road Signs in 2D and 3D Views

Figure 5:
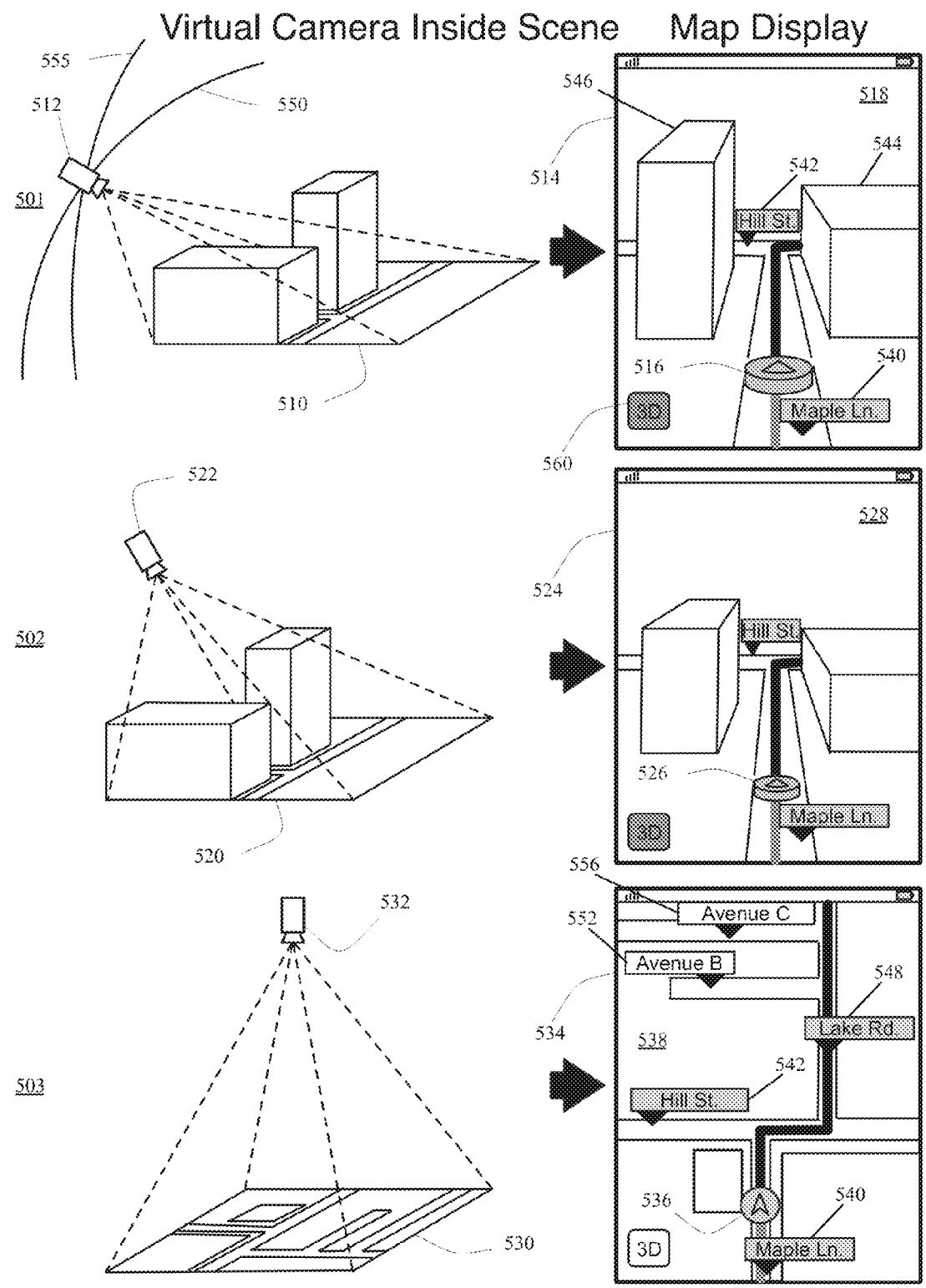
FIG. 5 illustrates an example of how road signs are presented in 2D and 3D.

The navigation application of some embodiments is capable of displaying navigation maps from multiple perspectives. The application can show a navigation presentation in three dimensions (3D) or in two dimensions (2D). In some embodiments, the application presents road signs in the 3D presentation and the 2D presentation. FIG. 5 illustrates an example of how road signs are presented in 2D and 3D. In this example, the 3D maps are generated simulations of a virtual scene as seen by a virtual camera. When rendering a 3D navigation map, a virtual camera is a conceptualization of the position in the 3D map scene from which the device renders a 3D view of the scene. FIG. 5 illustrates a location in a 3D navigation map scene 510 that includes four objects, which are two buildings and two intersecting roads. To illustrate the virtual camera concept, this figure illustrates three scenarios, each of which corresponds to a different virtual camera location (i.e., a different rendering position) and a different resulting view that is displayed on the device.

The first stage 501 shows the virtual camera 512 at a first position pointing downwards at an angle (e.g., a 30 degree angle) towards the 3D scene 510. By rendering the 3D scene from the position and angle shown in stage 501 the application generates the 3D map view 518. From this position, the camera is pointing at a location that is a moving position in front of the device. The virtual camera 512 is kept behind the current location of the device. "Behind the current location" in this case means backward along the navigation application's defined path in the opposite direction from the current direction that the device is moving in.

The navigation map view 518 looks as though it was shot by a camera from above and behind the device's location indicator 516. The location and angle of the virtual camera places the location indicator 516 near the bottom of the navigation map view 518. This also results in the majority of the screen being filled with the streets and buildings ahead of the present location of the device. In contrast, in some embodiments, the location indicator 516 (which is a colored puck in this example) is in the center of the screen, with half of the screen representing things ahead of the device and the other half representing things behind the device.

The second stage 502 shows the virtual camera 522 at a different position, pointing downwards towards the scene 520 at a larger second angle (e.g., −45°). The application renders the scene 520 from this angle, resulting in the 3D navigation map view 528. The buildings and the roads are smaller than their illustration in the first navigation map view 518. Once again, the virtual camera 522 is above and behind the location indicator 526 in the scene 520. This again results in the location identifier appearing in the lower part of the 3D map view 528. The location and orientation of the camera also result again in the majority of the screen displaying things ahead of the car, which is what someone navigating needs to know.

In the first two stages 501 and 502, the 3D navigation scenes display several road signs 540 and 542. The road sign 540 is for a road along the navigated route, while the road sign 542 is for a maneuver junction that is closest to the current position of the user. The current position is indicated by the graphical object 130 (which is a colored puck in this example).

The road signs 540 and 542 are presented by the navigation application as vertically standing objects in the 3D perspective navigation scenes. This vertical appearance is meant to simulate vertically standing road signs in the real world that the user passes along the navigated route. In some embodiments, the application augments the realistic look of such road signs by generating and displaying shadows for these road signs in the 3D scene, and/or by making the appearance of these road signs similar or identical to their appearance or expected appearance in the real world. Also, in some embodiments, the road signs are not made to look perfectly vertical in the 3D scene, but rather are made to look practically vertical, e.g., to be within a particular angle (e.g., 0 to 45 degrees) of such a vertical alignment.

When rendering a 3D presentation, the navigation application of some embodiments takes into account buildings and other constructs in a 3D presentation when dynamically presenting road signs. For example, the road sign 542 is positioned such that it is not hidden behind the building 544 or 546. The application may also eliminate road signs that might not be fully visible in a 3D presentation.

The third stage 503 shows the virtual camera 512 at a top-down view that looks downwards on a location on a 2D map that corresponds to the location in the 3D map scene 510 that was used to render the 3D views 518 and 528. The scene that is rendered from this perspective is the 2D map view 538. Unlike the 3D rendering operations of the first and second stages that in some embodiments are perspective 3D rendering operations, the rendering operation in the third stage is relatively simple as it only needs to crop a portion of the 2D map that is identified by a zoom level specified by the application or the user. Accordingly, the virtual camera characterization in this situation somewhat unnecessarily complicates the description of the operation of the application as cropping a portion of a 2D map is not a perspective rendering operation.

Different from the first two stages 501 and 502, the third stage 503 illustrates that the 2D view 538 shows additional road signs 548, 552, and 556. These road signs are not shown in the 3D map views (518 and 528) because the 2D view 538 shows a larger mapped area. In the example illustrated in the third stage 501, the road signs 540 and 542 retains their appearances from the 3D view. However, the road signs are shown as flat labels and not as vertically standing objects. In some embodiments, the navigation application does not change the appearance of road signs when switching from a 3D presentation to a 2D presentation, or vice versa. For example, the road signs 540 and 542 may appear as vertically standing objects or flat labels in both the 2D and 3D presentations.

The preceding example was described with reference to a virtual camera. In some embodiments, the virtual camera can be made to move by changing the zoom level for viewing the map after the map enters a 3D mode, as further described below. In some of these embodiments, the application switches to a top-down mode (where the rendering position faces straight down) that produces 2D views when the zoom level reaches a particular zoom out level. As in the third stage 503, the mapping application in some embodiments switches from rendering a 3D scene from a particular perspective direction to cropping a 2D scene when the camera switches from the 3D perspective view to a 2D top-down view. This is because in these embodiments, the application is designed to use a simplified rendering operation that is easier and that does not generate unnecessary perspective artifacts. In other embodiments, however, the mapping application uses perspective rendering operations to render a 3D scene from a top-down virtual camera position. In these embodiments, the 2D map view that is generated is somewhat different from the map view 538 illustrated in the third stage 503, because any object that is away from the center of the view is distorted, with the distortions being greater the further the object's distance from the center of the view.

The virtual camera 512 moves along different trajectories in different embodiments as the zoom level changes for the map view. Two such trajectories 550 and 555 are illustrated in FIG. 5. In both these trajectories, the camera moves in an arc and rotates more downward as the camera moves upwards on the arc. The trajectory 555 differs from the trajectory 550 in that in the trajectory 555 the camera moves backwards from the current location as it moves up the arc.

While moving along one of the arcs, the camera rotates to maintain a point ahead of the location indicator at the focal point of the camera. In some embodiments, the user can turn off the three dimensional view and go with a purely two-dimensional view. For example, the applications of some embodiments allow a three dimensional mode to be turned on and off by use of a 3D button 560. The 3D button 560 is essential to turn-by-turn navigation feature, where it has a role as an indicator and toggle. When 3D is turned off, the camera will maintain a 2D navigation experience, but when 3D is turned on, there may still be some top-down perspectives when 3D viewing angles don't make sense (e.g., when going around a corner that would be obstructed in 3D mode).

II. Road Sign Considerations

An example process for dynamically presenting road signs will be described below. However, before describing the process, several example considerations that can factor into how the navigation application of some embodiments generates the road signs will now be described.

A. Utility

Figure 6:
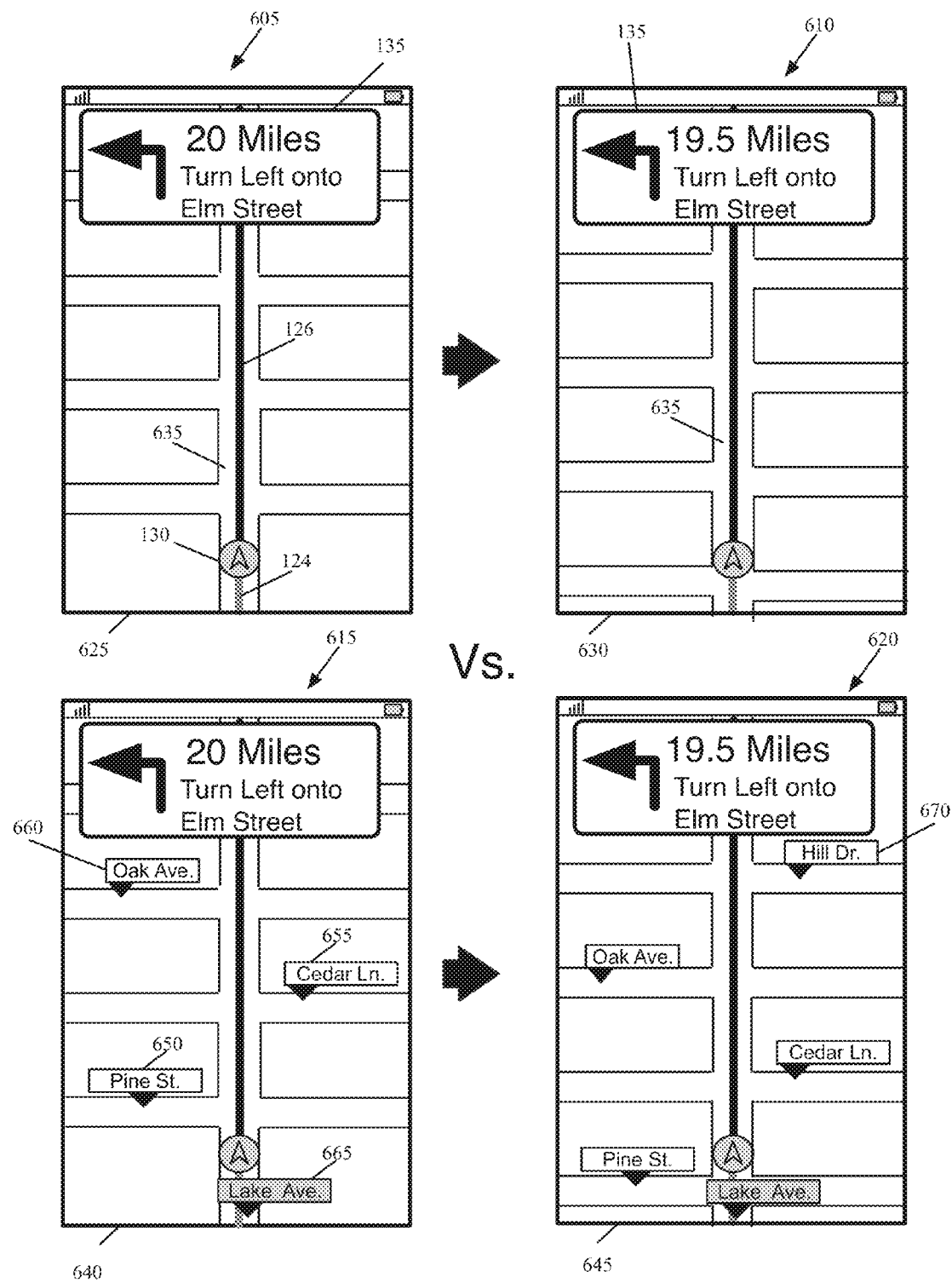
FIG. 6 illustrates a first navigation presentation without any road signs and a second navigation presentation with road signs.

As mentioned above, the application of some embodiments shows road signs for utility purposes. Specifically, the road signs provide some context for the navigation instructions, and help the user associate the instructions during navigation with the area that the user is navigating in the real world. FIG. 6 illustrates two contrasting navigation presentations. The first presentation includes two stages 605 and 610 of operations that relate to two different positions of the device along a navigated route. This first presentation is shown without any road signs. The second presentation is similar to the first presentation but shows two stages 615 and 620 with road signs.

The first stage 605 of the first presentation shows a first scene 625 of the first navigation presentation. The scene includes a road 635 that is along the navigated route, as indicated by a graphical object 130 (which is a colored puck in this example), a first color line 124 that trails this object, a second color line 126 that leads this object, and a banner 135. This presentation also includes several other roads that intersect the navigated route. These roads are non-maneuver junctions. No road signs are shown in this scene of the first navigation presentation.

The second stage 610 shows a second scene 630 of the first navigation presentation after the user has moved some distance towards the destination. However, there is very little context in relation to the current location of the user. The scene 630 is similar to the one shown in the previous stage 605. The scene shows the road 635 with several non-maneuver junctions that cross that road. Similar to the previous stage, no road signs are shown in the second scene. The main difference between the first and second stages 605 and 610 is that the banner 135 has been updated to state that the user is closer in distance to the next maneuver junction.

The first stage 615 of the second presentation shows a first scene 640 of the second navigation presentation. This scene 640 is identical to the first scene 625 of the first presentation. However, the scene 640 includes several road signs 650, 655, 660, and 665. The scene includes a road sign 665 for the road that is along the navigated route. The scene also includes road signs 650, 655, and 660 for roads that intersect the navigated route. These road signs provide some context in relation to the current location of the user. Providing such road signs can be useful as it allows the user to identify different roads along the route. By identifying such roads, the user can take a different route to move towards the same destination or to move towards another destination.

The second stage 620 of the second presentation shows a second scene 645 of the second navigation presentation. This scene is similar to the previous stage 615. However, the scene 645 includes one additional road sign 670 for a road that intersects the navigated route. In this example, the road sign 670 provides visual feedback to the user that he or she is moving along the route. This is different from the second stage 610 of the first presentation, which provides less visual feedback in relation to the movement of the user along the route.

In the example illustrated in the first and second stages 615 and 620 of the second presentation, the navigation application has identified different non-maneuver junctions along the route and presented road signs for those junctions. As mentioned above, the navigation application may also present road signs at junctions along the navigated route that require a change of direction. In some embodiments, the application differentiates the appearance of road signs at junctions along the navigated route that require a change of direction from road signs at junctions along the route that do not require a change of direction. For example, the application may display the different types of road sign using different colors. The different appearances of the road signs can be useful because they allow the application's user to distinguish important roads (e.g., maneuver junctions) from other less important roads (e.g., non-maneuver junctions).

B. Aesthetic Distribution of Road Signs

Figure 7:
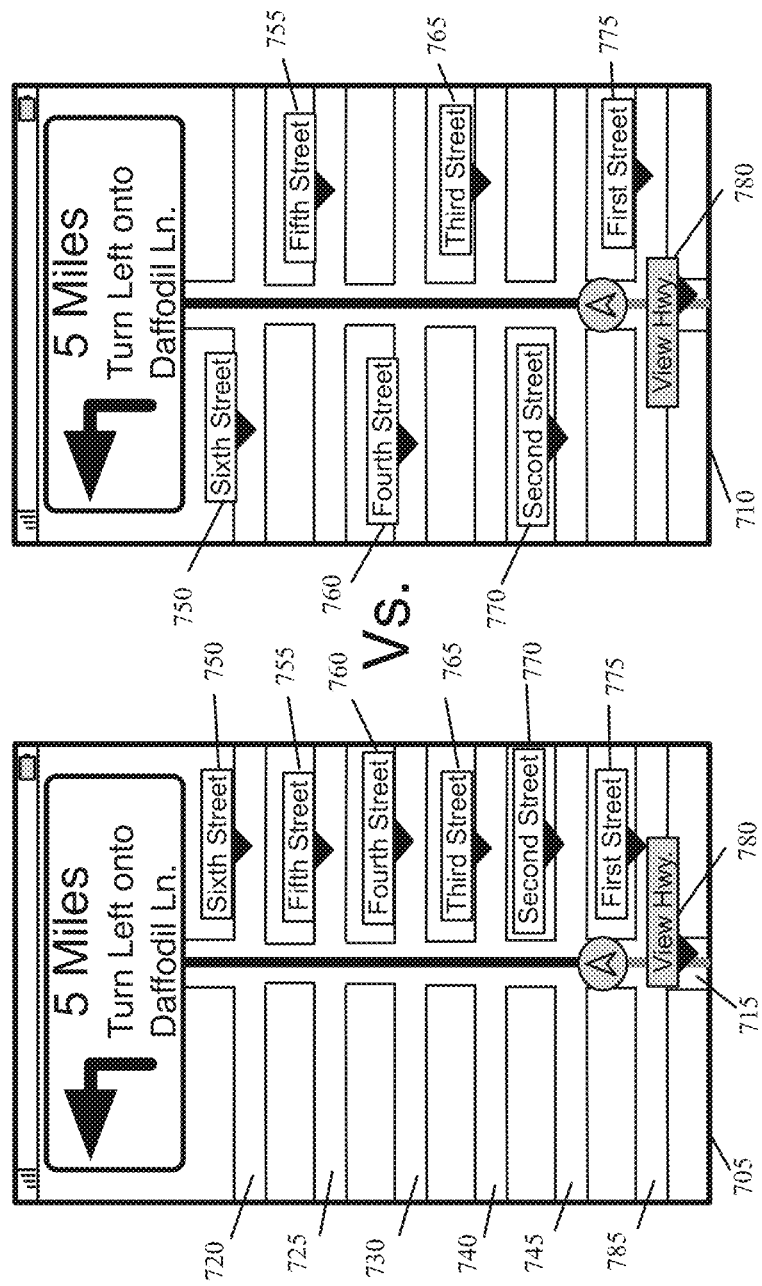
FIG. 7 illustrates two contrasting scenes of a same location along a navigated route.

In some embodiments, the navigation application performs operations to ensure that it arranges road signs on a map in an aesthetically pleasing manner. These operations may entail evenly distributing the road signs about a navigated route as much as possible. FIG. 7 illustrates two contrasting scenes 705 and 710 of a same location along a navigated route. In particular, the scene 705 illustrates how the location appears when road sign aesthetics are not taken into consideration, while the scene 710 illustrates how the same location appears when road sign aesthetics are taken into consideration.

The scene 705 shows a road 715 along the navigated route and several other roads 720, 725, 730, 740, 745, and 785 that intersect that road. The scene also shows a road sign 780 for the road 715 along the navigated route, and road signs 750-775 for the roads that intersect the road 715. As the scene is rendered without taking into account road sign aesthetics, the road signs 750-775 are arranged on one side of the navigated route. Specifically, the right-hand side of the navigated route is cluttered with the road signs 750-775, while the left-hand side of the navigated route has no road signs.

The scene 710 illustrates how the same location appears when road sign aesthetics are taken into consideration. In factoring in the aesthetics of the presentation, the application has arranged the road signs such that they do not appear on one side of the navigated route. In this example, the road signs 750-775 alternate evenly between the left-hand and right-hand sides of the navigated route. In addition, the road sign 780 for the road along the navigated route is displayed as extending out towards the left-hand side of the navigated route so that it is not shown on the same side as the next road sign 775, which is on the right-hand side of the navigated route. In evenly distributing the road signs, the application of some embodiments starts from the direction of travel of the user along the navigated route, iterates through the succeeding identified road signs for display, and if possible places each road sign in each iteration on a different side of the navigated route.

In the previous example, the application of some embodiments alternates road signs for roads that intersect or overlap with the navigated route. In some embodiments, the navigation application arranges other nearby roads so that they appear as alternating between opposite sides of the navigated route. For instance, when there are a few or no intersecting or overlapping roads, the application may select several nearby roads based on their position with respect to the navigated route. The application may then show road signs for the selected roads as alternating evenly between the different sides of the navigated route.

C. Number of Road Signs

Figure 8:
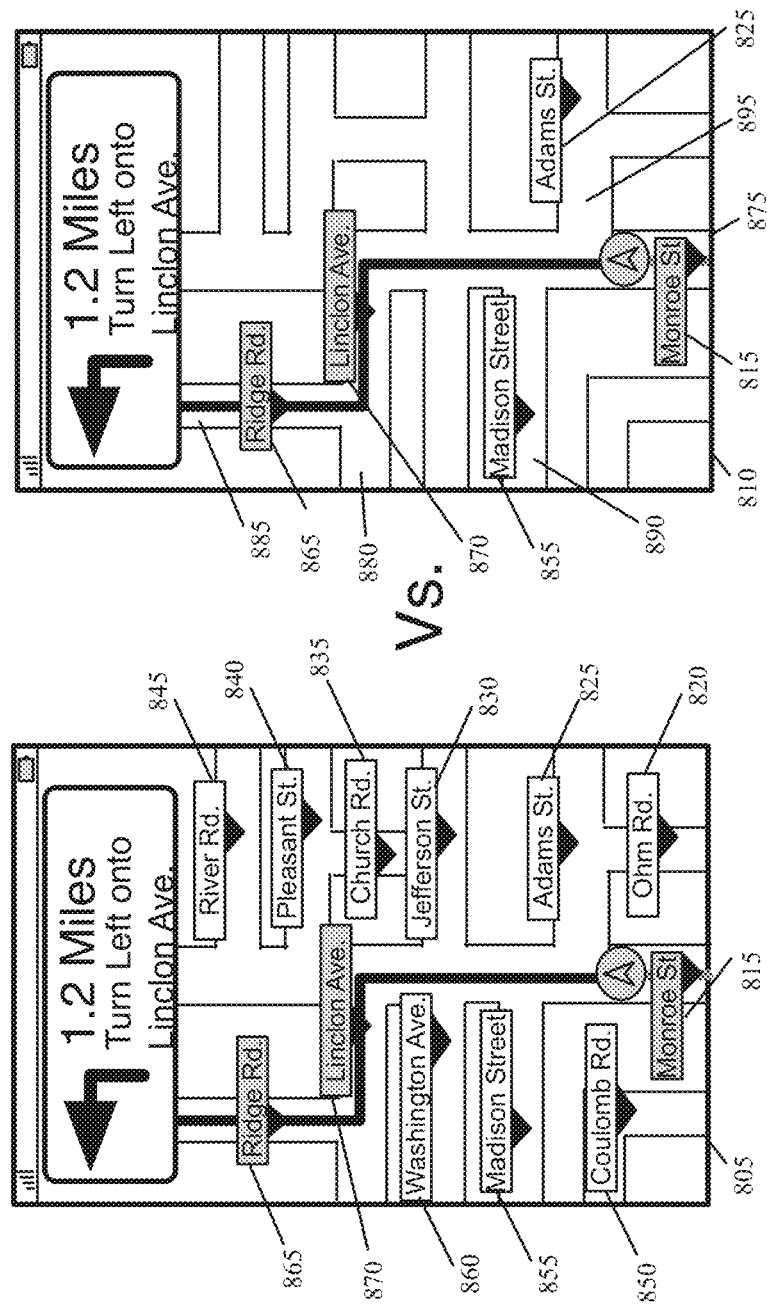
FIG. 8 illustrates a first scene that does not take into account the maximum number of road signs, and a second scene that does take into account the maximum number of road signs.

In some embodiments, the navigation application performs operations that ensure that it does not place too many or too few road signs in one view of a navigation presentation. As mentioned above, the application of some embodiments uses a predetermined or user-defined maximum and minimum numbers of road signs that can appear in the view at any given time. Based on these numbers, the application then identifies the roads for which it should show road signs. FIG. 8 illustrates two contrasting scenes 805 and 810 of a same location along a navigated route. In particular, the scene 805 illustrates how the location appears when the maximum number is not taken into consideration, while the scene 810 illustrates how the same location appears when the maximum number is taken into consideration.

As shown in FIG. 8, the scene 805 shows several roads along the navigated route and several other roads (e.g., intersecting roads, nearby roads). The scene 805 is cluttered with road signs 815-870. The scene 805 shows a road sign 815 for the road along the navigated route, and road signs 820-870 for all the other roads. All these road signs 815-870 are shown because the scene is rendered without taking into account the maximum number of road signs that can appear in one scene.

The scene 810 illustrates how the same location appears when the maximum number is taken into consideration. The scene 810 is not cluttered with road signs. The navigation application has selected several roads 875-895, and then dynamically presented road signs for only those selected roads. Specifically, the scene shows road sign 815, 865, and 870 for the roads 875, 885, and 880 that are along the navigated route. The scene also shows two road signs 825 and 855 for two roads 895 and 890 that intersect the navigated route.

In some embodiments, the navigation application categorizes different roads, and uses the categorization to select several roads. The application then displays road signs for only those selected roads. For example, when there are too many road signs, the application might display road signs for several important roads (e.g., for roads that are along a navigated route, for maneuver junctions) and not display road signs for less important roads (e.g., for non-maneuver junctions, for other nearby roads). Several examples of selectively presenting road signs will now be described below by reference to FIGS. 9 and 10.

1. Number of Intersecting/Overlapping Roads

Figure 9A:
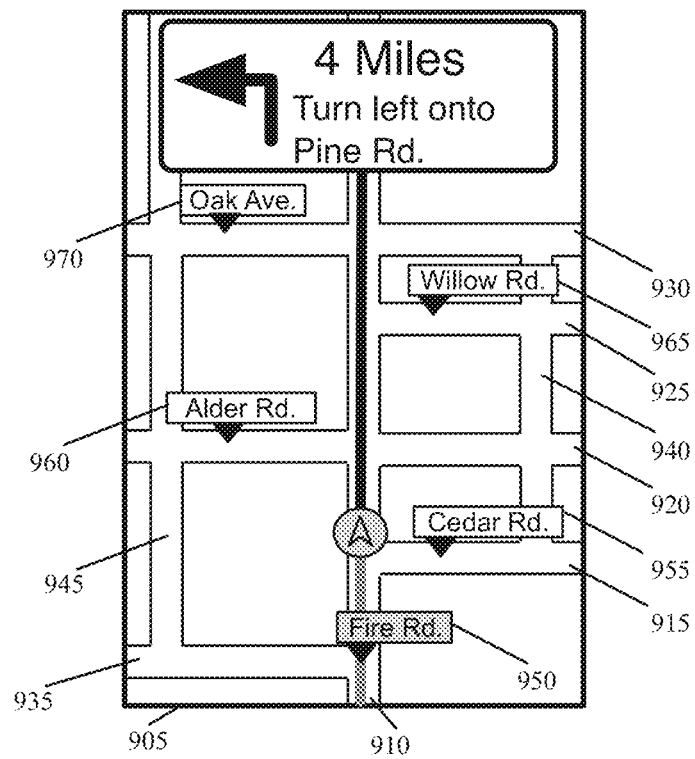
FIG. 9A illustrates an example of how the navigation application presents road signs when there are many roads that intersect or overlap a navigated route.

FIG. 9A illustrates an example of how the navigation application presents road signs when there are many roads that intersect or overlap a navigated route. Specifically, this figure illustrates how the navigation application selectively presents road signs for intersecting or overlapping roads over other nearby roads.

As shown in FIG. 9A, the scene 905 shows a road 910 along a navigated route and several other roads 915-945. The roads 915-935 intersect or meet the route in the scene, while the roads 940 and 945 are nearby streets that do not intersect or meet the route. In this example, the navigation application has selected the road 910 along the navigated route and presented a road sign 950 for that road. The application has also selected several of the intersecting roads 915-930 and presented road signs 955-970 for these roads. For instance, the application may select as many intersecting roads as possible based on a threshold value. In other words, instead of showing road signs for the nearby roads 940 and 945, the application has selected a group of roads 915-930 that intersects the navigated route, and presented road signs 955-970 for only those roads that are in the group. The intersecting road 935 might not have been selected because the maximum number of road signs to show in one view has been reached and/or the user has crossed that road.

Figure 9B:
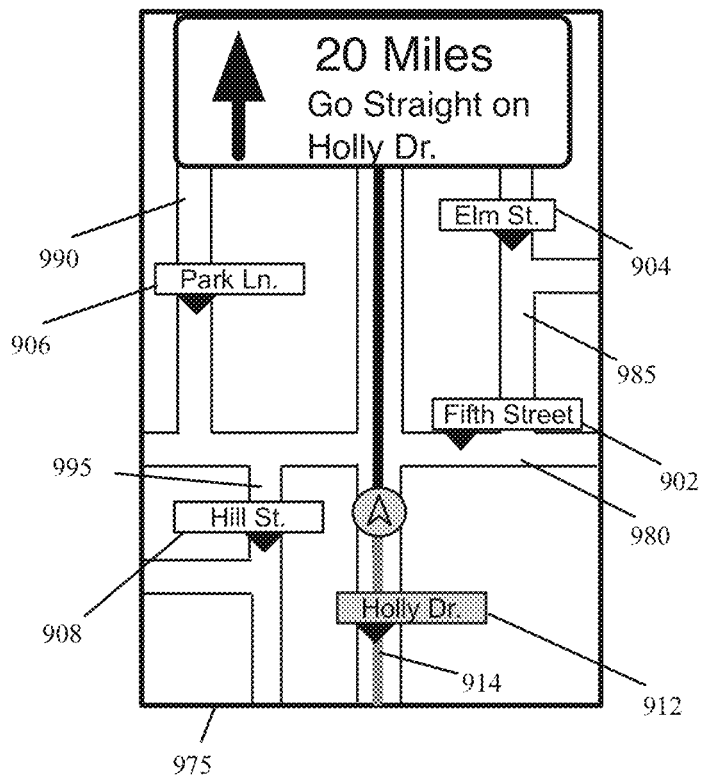
FIG. 9B illustrates an example of how the navigation application presents road signs when there are a few roads that intersect or overlap a navigated route.

When there are a few intersecting or overlapping roads, the navigation application of some embodiments performs operations that ensure that it presents road signs for other nearby roads. FIG. 9B illustrates an example of how the navigation application presents road signs when there are a few roads that intersect or overlap a navigated route.

As shown in FIG. 9B, the scene 975 shows a road 914 along a navigated route and several other roads 980-995. The road 980 intersects the route in the scene, while the roads 985-995 are nearby streets that do not intersect the route. In this example, the navigation application has selected the road 914 along the navigated route and presented a road sign 912 for that road. Also, the application has selected the road 980 that intersect the route and presented a road sign 902 for the intersecting road. In addition, the application has selected several of the nearby roads 985-995 and presented road signs 904-908 for these roads. That is, as there is only one road 980 that intersects the navigated route, the application has selected a group of nearby roads 985-995 that do not intersect the navigated route, and presented road signs 904-908 for those roads that are in the group.

The previous example illustrated a scenario where there are a few roads that intersect or overlap a navigated route. In some embodiments, the navigation application performs operations that ensure that it presents at least one or more road signs when there are no intersecting or overlapping roads. This can occur in a number of different scenarios. For instance, the application's user might be traveling down a long stretch of highway without a nearby exit, or traveling down a rural area with a few parallel roads and no intersecting or overlapping roads.

Figure 10:
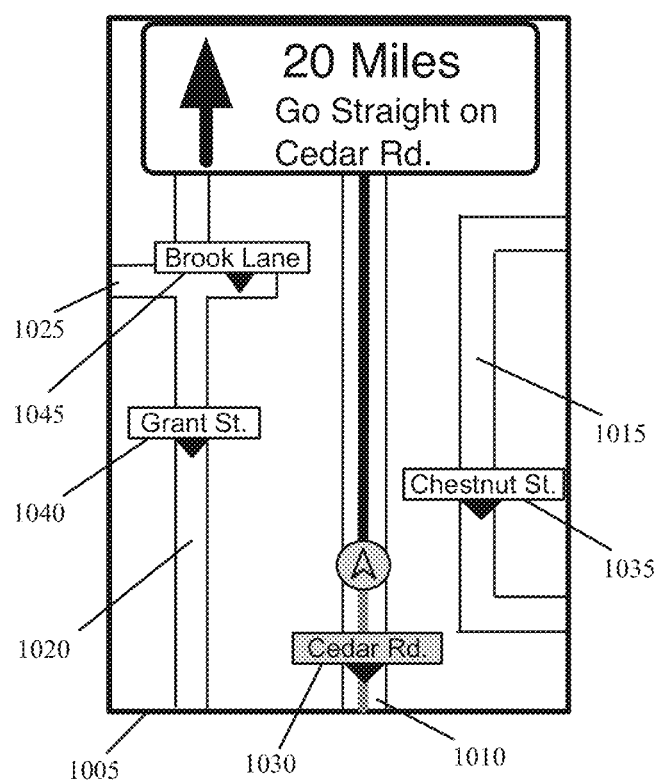
FIG. 10 illustrates an example of presenting road signs when there are no intersecting or overlapping roads.

As shown in FIG. 10, the scene 1005 shows a road 1010 along a navigated route and several other roads 1015-1025. In this scene, the roads 1015-1025 do not intersect the navigated route. One or more of these roads may never intersect the navigated route. Here, the navigation application has selected the road 1010 along the navigated route and presented a road sign 1030 for that road. The application has also selected several of the nearby roads 1015-1025 and presented road signs 1035-1045 for these roads. That is, as there are no intersecting or overlapping roads, the application has selected a group of nearby roads 1015-1025 that do not intersect the navigated route, and presented road signs 1035-1045 for those roads that are in the group. One or more of these roads may never meet the navigated route. However, the application has provided the road signs 1035-1045 to provide some feedback as to where the user is along the route.

D. Categorization

In several of the examples described above, the navigation application presents road signs for several selected roads. To perform the selection operations, the navigation application of some embodiments categorizes different types of roads into different tiers. Several different example categorization schemes will now be described by reference to FIG. 11.

Figure 11A:
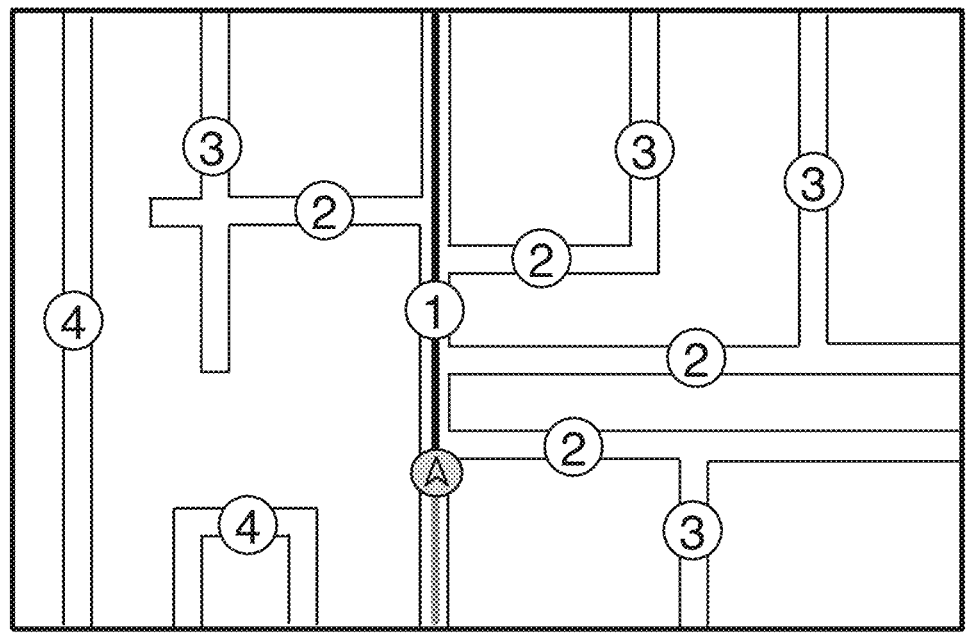
FIG. 11A illustrates one example of how the application of some embodiments categorizes different type of roads.

FIG. 11A illustrates one example of how the application of some embodiments categorizes different type of roads. In this example, the application has categorized a road on the navigated route as tier 1. The application has also categorized all roads that intersect or overlap with the navigated route as tier 2. In addition, the application has categorized all roads that intersect the tier 2 roads as tier 3. All other roads have been categorized as tier 4 roads.

Figure 11B:
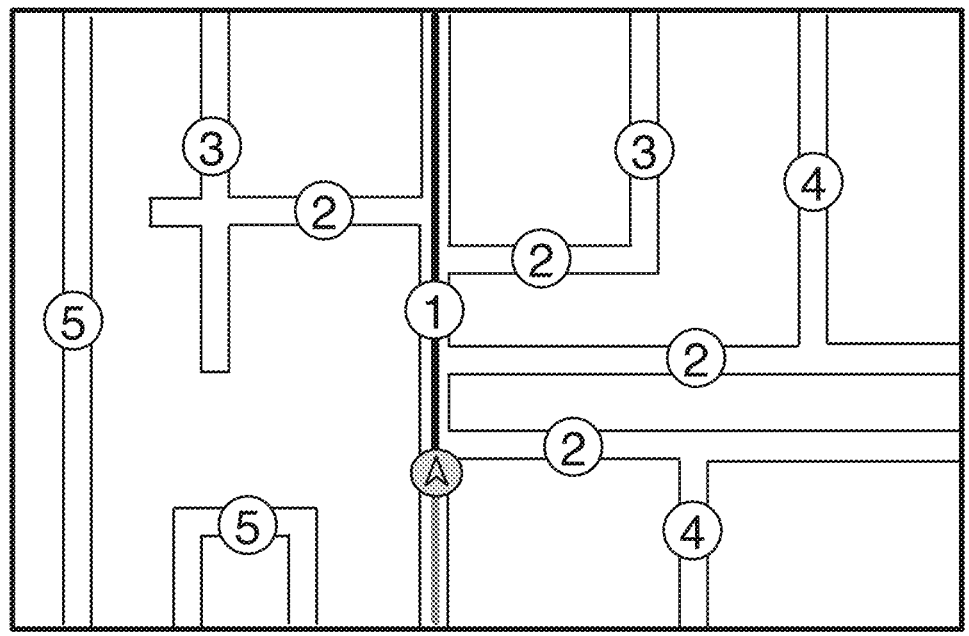
FIG. 11B illustrates another example of how the application of some embodiments categorizes different type of roads.

The navigation application of other embodiments defines the road tiers differently. FIG. 11B illustrates another example of how the application of some embodiments categorizes different type of roads. In this example, the application categorizes roads that intersect the above mentioned tier 2 roads differently based on the distance of these roads to the navigated route, and/or based on the time it would take for the device to reach these roads from the navigated route.

As shown in FIG. 11B, the application has categorized the road on the navigated route as tier 1. The application has also categorized all roads that intersect or overlap with the navigated route as tier 2. Different from FIG. 11A, the application has categorized all roads that intersect the tier 2 roads as tier 3 when these roads are within a threshold distance of the navigated route and/or when these roads can be reached from the navigated route within a threshold time. Furthermore, the application has categorized all roads that intersect the tier 2 roads as tier 4 when these roads are not within a threshold distance of the navigated route and/or when these roads cannot be reached from the navigated route within a threshold time. Lastly, the application has categorized all other roads as tier 5 roads. Still other embodiments use other mechanisms to categorize roads and/or have other number of tiers. The navigation application of other embodiments defines the road tiers differently.

E. Distance and Time

In some embodiments, the navigation application performs operations that ensure that it presents road signs for roads differently based on the distance of these roads to the navigated route, and/or based on the time it would take for the device to reach these roads from the navigated route. Several examples of such presentations will now be described by reference to FIG. 12.

Figure 12A:
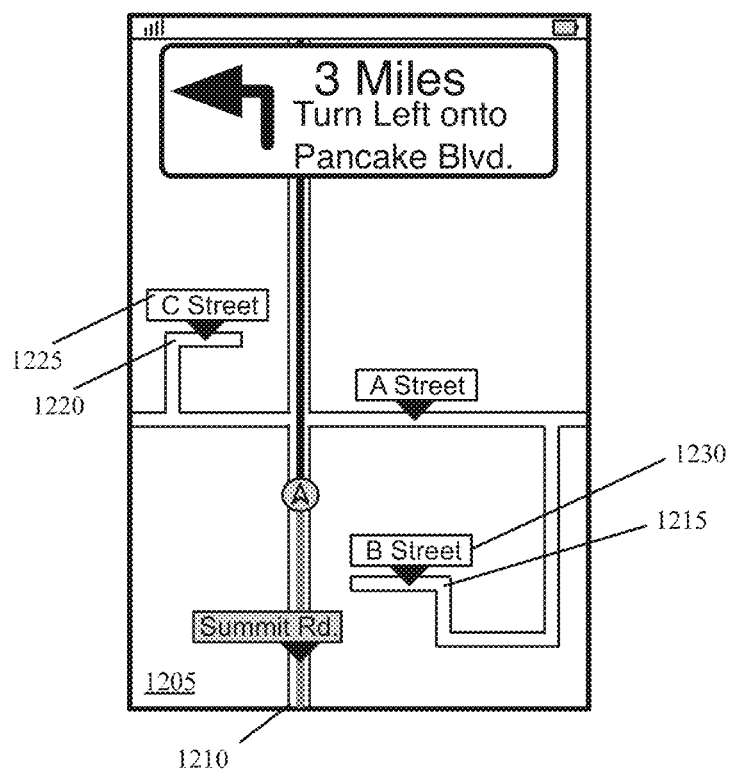
FIG. 12A illustrates an example of how the navigation application of some embodiments presents road signs based on distance.

FIG. 12A illustrates an example of how the navigation application of some embodiments presents road signs based on the distance of these roads to the navigated route. As shown, the scene 1205 shows a road 1210 along a navigated route and several other roads, including roads 1215 and 1220. In this example, the navigation application has presented road signs 1225 and 1230 for the roads 1220 and 1215. These road signs were presented based on a straight-line distance from each road (e.g., from the closest point of the road) to the navigated route.

Figure 12B:
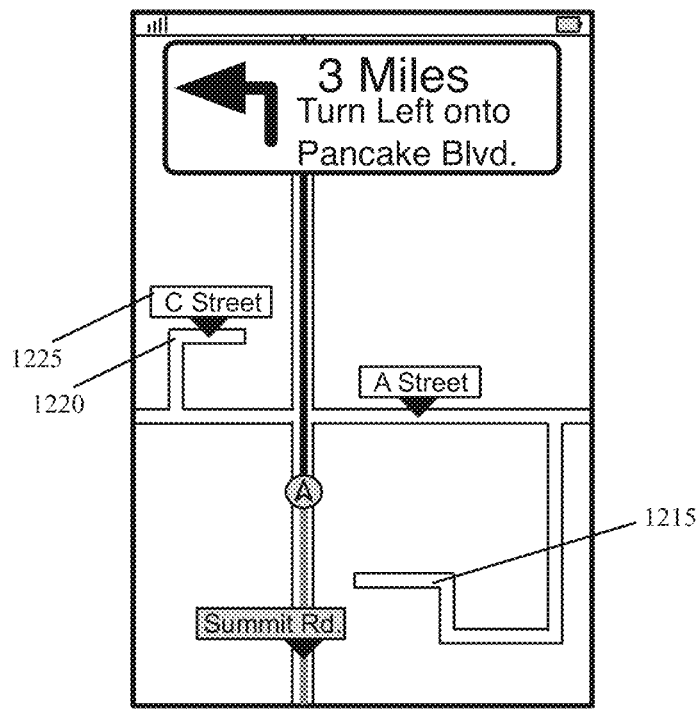
FIG. 12B illustrates an example of how the navigation application of some embodiments presents road signs based on the time.

In the previous example, the navigation application has presented road signs 1225 and 1230 based on the distance of these roads 1215 and 1220 from the navigated route. However, as shown in FIG. 12A, it takes a longer time to reach the road 1215 from the navigated route than it would to reach the road 1220. FIG. 12B illustrates an example of how the navigation application of some embodiments presents road signs based on the time it would take for the device to reach these roads from the navigated route. Specifically, this example illustrates how the navigation application does not show a road sign for a road that takes a long time to reach, even though that road is close to the navigated route. This example is similar to the previous example. However, the navigation application has presented the road sign 1225 for the road 1220 but has not presented the road sign 1230 for the road 1215.

The preceding section described several example factors that the navigation application of some embodiments might consider when presenting road signs. For example, the application might consider the distance factor without the time factor. In some embodiments, the application considers other factors such as road classification (e.g., highway, small roads or local roads, arterials or major roads, freeways, collectors that collect traffic from local roads and distribute it to arterials, etc.). For instance, when there are a number of different junctions (e.g., non-maneuver junctions), the application may choose to present road signs for major roads or highways instead of smaller roads. In addition, the application may consider whether a particular road is connected to the navigated route.

III. Example Process for Labeling a Navigation Presentation

Figure 13:
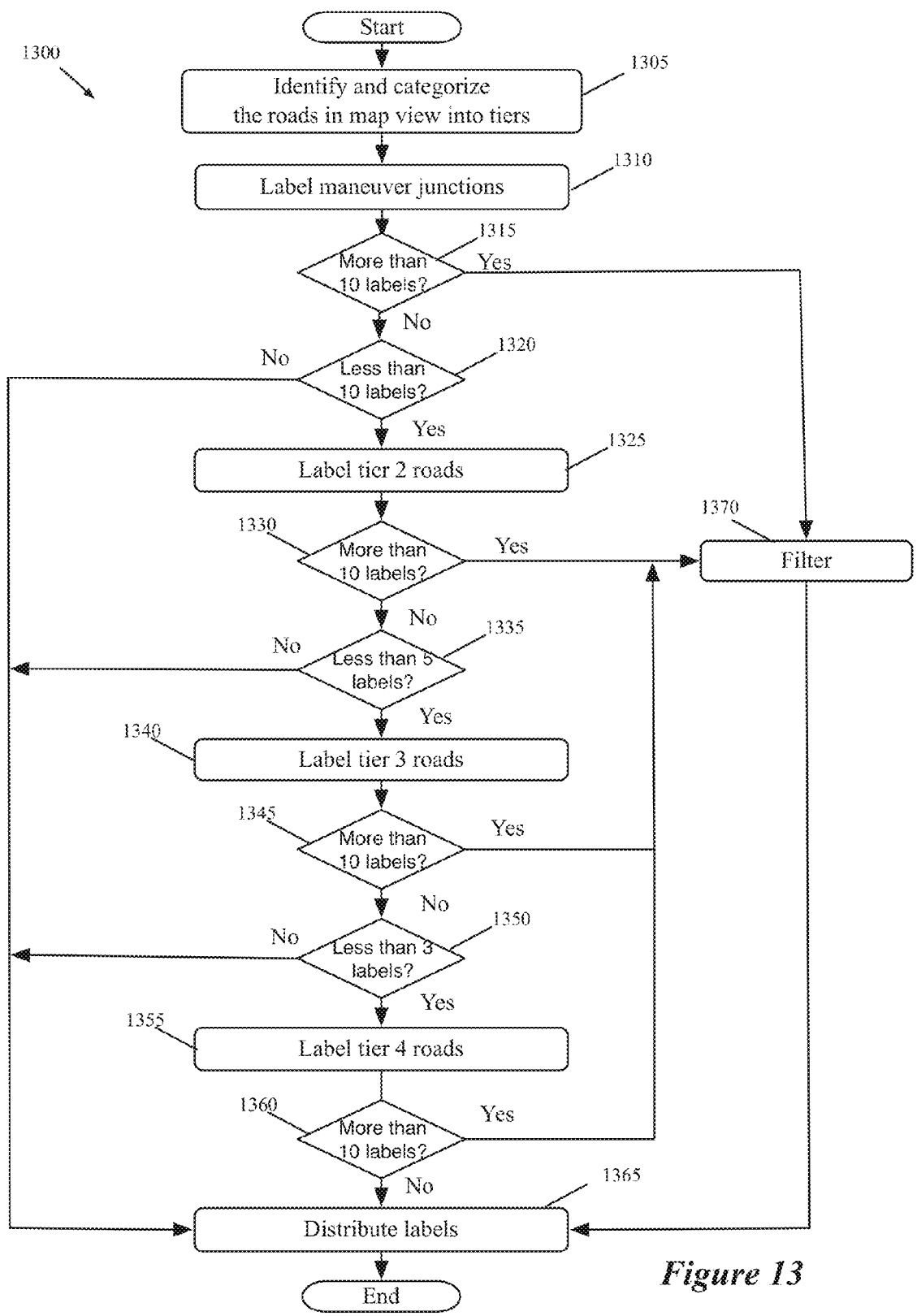
FIG. 13 conceptually illustrates a process that some embodiments use to label a navigation presentation with road signs.

The previous section described several example considerations that can factor into how the navigation application of some embodiments labels a navigation presentation with road signs. FIG. 13 illustrates a process 1300 that some embodiments use to label a navigation presentation with road signs. This process starts in some embodiments when the navigation application is directed to start a navigation presentation to provide navigation instructions to allow a user to navigate between two locations.

As shown in FIG. 13, the process initially identifies (at 1305) the roads in a map view and categorizes these roads into tiers. As mentioned above, the navigation application in some embodiments categorizes the roads into tiers in order to select the road signs for display. After categorizing the roads into several tiers, the process labels (at 1310) junctions where the user has to make a maneuver to stay on a navigation route.

Next, the process determines (at 1315) whether there are more than ten labels. If so, the process proceeds to 1370, which is described below. Otherwise, the process determines (at 1320) whether there are less than ten labels. When there are less than ten labels, the process labels (at 1325) tier 2 roads. In some embodiments, tier 2 roads are those that intersect or overlap the navigated route. Alternatively, tier 2 roads may not include any overlapping roads; or may include them as long as they are connected to the navigated route, or they can be reached within a certain amount of time. If the determination is made that there are ten labels, the process proceeds to 1365, which is described below.

After labeling tier 2 roads, the process determines (at 1330) whether there are more than ten labels. If so, the process proceeds to 1370, which is described below. Otherwise, the process determines (1335) whether there are less than five labels. When there are less than five labels, the process labels (at 1340) tier 3 roads. In some embodiments, a tier 3 road is a road that is one hop or two hops (e.g., turns, steps, maneuvers) from a tier 2 road. If the determination is made that there are five labels, the process proceeds to 1365, which is described below.

After labeling tier 3 roads, the process determines (at 1345) whether there are more than ten labels. If so, the process proceeds to 1370, which is described below. Otherwise, the process determines (at 1350) whether there are less than three labels. When there are less than three labels, the process labels (at 1355) tier 4 roads. In some embodiments, tier 4 roads include all other roads that may or may not be connected to the navigated route.

After labeling tier 4 roads, the process determines (at 1360) whether there are more than ten labels. When there are more than ten labels, the process performs (at 1370) a filtering operation. The process may use any one or more different filtering operations. One example filtering operation is to eliminate labels that are furthest from the direction of travel that is non-junction based. In some cases, such a filter operation can lead to road labels being cluttered in one area that is closer to the current location. Accordingly, the process might perform a combination of filtering operations so that road signs are not cluttered in one area. In some embodiments, the application considers other factors such as road classification (e.g., highway, small roads or local roads, arterials or major roads, freeways, collectors that collect traffic from local roads and distribute it to arterials, etc.). For instance, when there are a number of different junctions (e.g., non-maneuver junctions), the application may choose to present road signs for major roads or highways instead of smaller roads.

As shown in FIG. 13, the process then distributes (at 1365) the labels. In some embodiments, the process starts from the direction of travel of the user along the navigation route, iterates through the succeeding identified road signs for display, and if possible places each road sign in each iteration on a different side of the navigated route, in order to distribute evenly the road signs about the navigated route as much as possible. The process then ends.

The specific operations of the process 1300 may not be performed in the exact order shown and described. The specific operations may not be performed in one continuous series of operations, and different specific operations may be performed in different embodiments. For example, the numbers (i.e., ten, five, three) are threshold numbers that can be changed in various different ways. In addition, the process of some embodiments utilizes a different tier system (e.g., a three-tier system, a five-tier system). In such a case, the process may perform additional operations or fewer operations in presenting road signs. Furthermore, each of these process could be implemented using several sub-processes, or as part of a larger macro process.

IV. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 14:
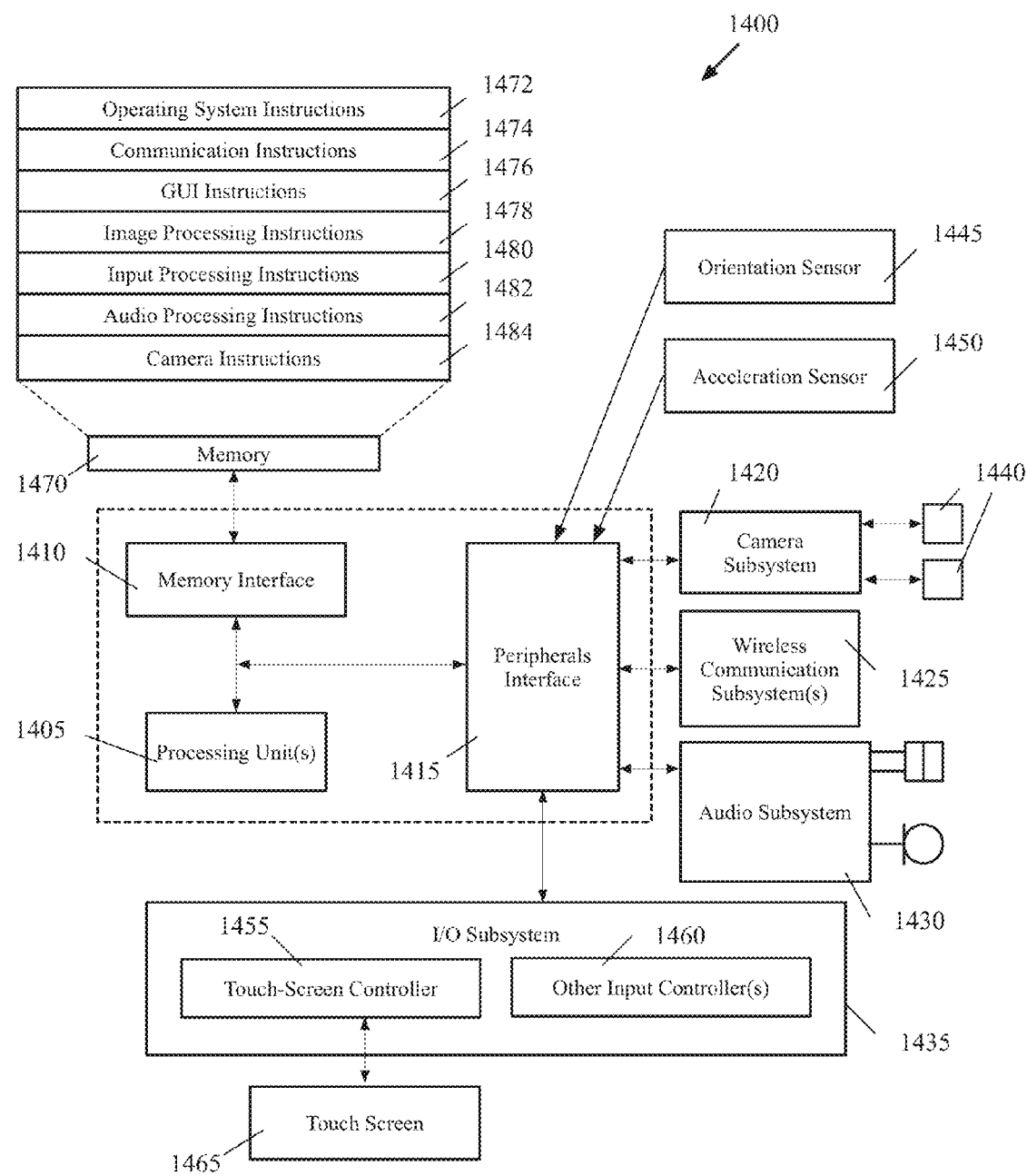
FIG. 14 illustrates an example architecture for a mobile computing device FIG. 15 conceptually illustrates another example of an electronic system 1500 with which some embodiments of the invention are implemented.

The mapping and navigation applications of some embodiments operate on mobile devices, such as smart phones (e.g., iPhones®) and tablets (e.g., iPads®). FIG. 14 is an example of an architecture 1400 of such a mobile computing device. Examples of mobile computing devices include smartphones, tablets, laptops, etc. As shown, the mobile computing device 1400 includes one or more processing units 1405, a memory interface 1410 and a peripherals interface 1415.

The peripherals interface 1415 is coupled to various sensors and subsystems, including a camera subsystem 1420, a wireless communication subsystem(s) 1425, an audio subsystem 1430, an I/O subsystem 1435, etc. The peripherals interface 1415 enables communication between the processing units 1405 and various peripherals. For example, an orientation sensor 1445 (e.g., a gyroscope) and an acceleration sensor 1450 (e.g., an accelerometer) is coupled to the peripherals interface 1415 to facilitate orientation and acceleration functions.

The camera subsystem 1420 is coupled to one or more optical sensors 1440 (e.g., a charged coupled device (CCD) optical sensor, a complementary metal-oxide-semiconductor (CMOS) optical sensor, etc.). The camera subsystem 1420 coupled with the optical sensors 1440 facilitates camera functions, such as image and/or video data capturing. The wireless communication subsystem 1425 serves to facilitate communication functions. In some embodiments, the wireless communication subsystem 1425 includes radio frequency receivers and transmitters, and optical receivers and transmitters (not shown in FIG. 14). These receivers and transmitters of some embodiments are implemented to operate over one or more communication networks such as a GSM network, a Wi-Fi network, a Bluetooth network, etc. The audio subsystem 1430 is coupled to a speaker to output audio (e.g., to output voice navigation instructions). Additionally, the audio subsystem 1430 is coupled to a microphone to facilitate voice-enabled functions, such as voice recognition (e.g., for searching), digital recording, etc.

The I/O subsystem 1435 involves the transfer between input/output peripheral devices, such as a display, a touch screen, etc., and the data bus of the processing units 1405 through the peripherals interface 1415. The I/O subsystem 1435 includes a touch-screen controller 1455 and other input controllers 1460 to facilitate the transfer between input/output peripheral devices and the data bus of the processing units 1405. As shown, the touch-screen controller 1455 is coupled to a touch screen 1465. The touch-screen controller 1455 detects contact and movement on the touch screen 1465 using any of multiple touch sensitivity technologies. The other input controllers 1460 are coupled to other input/control devices, such as one or more buttons. Some embodiments include a near-touch sensitive screen and a corresponding controller that can detect near-touch interactions instead of or in addition to touch interactions.

The memory interface 1410 is coupled to memory 1470. In some embodiments, the memory 1470 includes volatile memory (e.g., high-speed random access memory), non-volatile memory (e.g., flash memory), a combination of volatile and non-volatile memory, and/or any other type of memory. As illustrated in FIG. 14, the memory 1470 stores an operating system (OS) 1472. The OS 1472 includes instructions for handling basic system services and for performing hardware dependent tasks.

The memory 1470 also includes communication instructions 1474 to facilitate communicating with one or more additional devices; graphical user interface instructions 1476 to facilitate graphic user interface processing; image processing instructions 1478 to facilitate image-related processing and functions; input processing instructions 1480 to facilitate input-related (e.g., touch input) processes and functions; audio processing instructions 1482 to facilitate audio-related processes and functions; and camera instructions 1484 to facilitate camera-related processes and functions. The instructions described above are merely exemplary and the memory 1470 includes additional and/or other instructions in some embodiments. For instance, the memory for a smartphone may include phone instructions to facilitate phone-related processes and functions. Additionally, the memory may include instructions for a mapping and navigation application as well as other applications. The above-identified instructions need not be implemented as separate software programs or modules. Various functions of the mobile computing device can be implemented in hardware and/or in software, including in one or more signal processing and/or application specific integrated circuits.

While the components illustrated in FIG. 14 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 14 may be split into two or more integrated circuits.

B. Computer System

Figure 15:
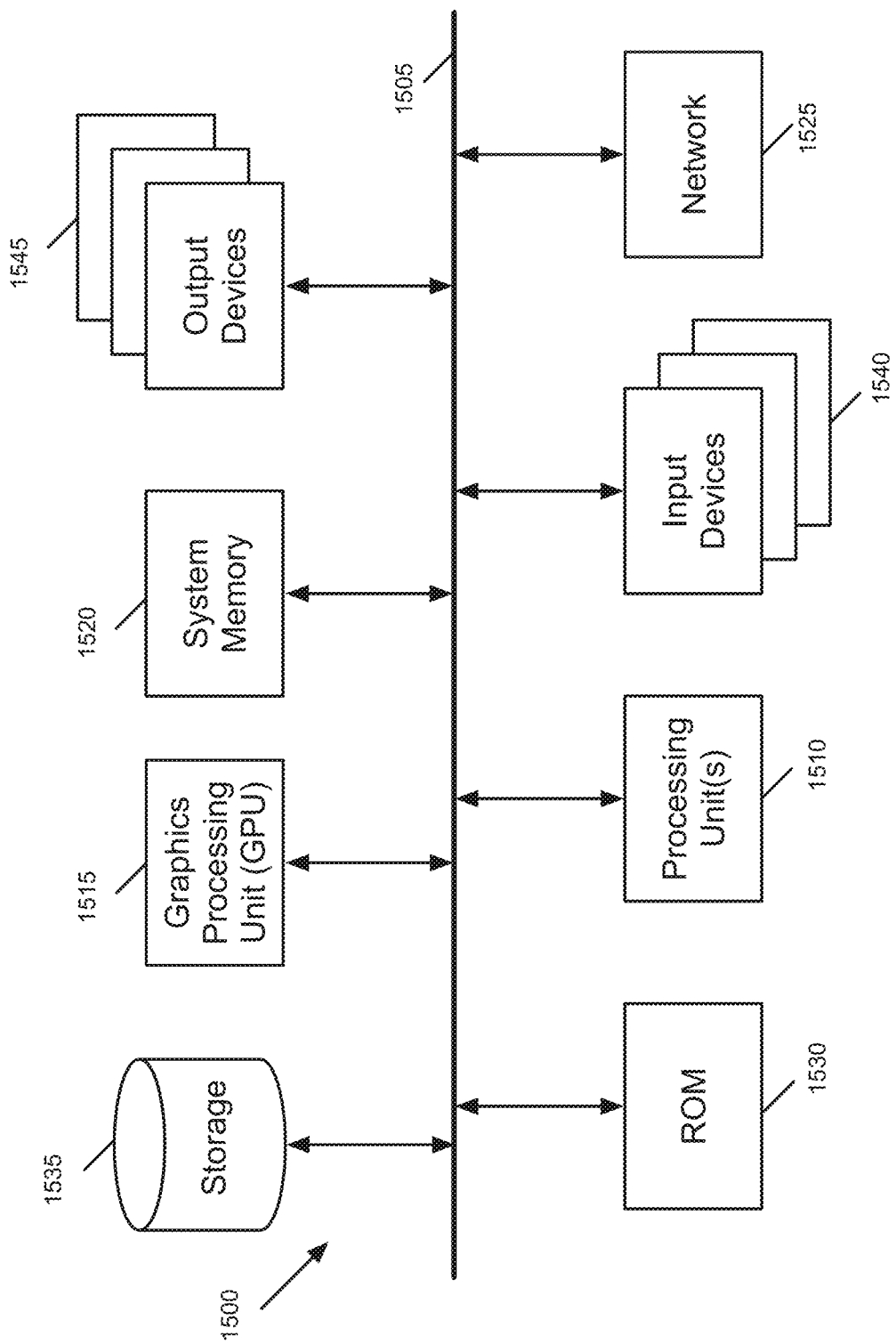

FIG. 15 conceptually illustrates another example of an electronic system 1500 with which some embodiments of the invention are implemented. The electronic system 1500 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1500 includes a bus 1505, processing unit(s) 1510, a graphics processing unit (GPU) 1515, a system memory 1520, a network 1525, a read-only memory 1530, a permanent storage device 1535, input devices 1540, and output devices 1545.

The bus 1505 collectively represents all system, peripheral, and chipset buses that communicatively connect the numerous internal devices of the electronic system 1500. For instance, the bus 1505 communicatively connects the processing unit(s) 1510 with the read-only memory 1530, the GPU 1515, the system memory 1520, and the permanent storage device 1535.

From these various memory units, the processing unit(s) 1510 retrieves instructions to execute and data to process in order to execute the processes of the invention. The processing unit(s) may be a single processor or a multi-core processor in different embodiments. Some instructions are passed to and executed by the GPU 1515. The GPU 1515 can offload various computations or complement the image processing provided by the processing unit(s) 1510.

The read-only-memory (ROM) 1530 stores static data and instructions that are needed by the processing unit(s) 1510 and other modules of the electronic system. The permanent storage device 1535, on the other hand, is a read-and-write memory device. This device is a non-volatile memory unit that stores instructions and data even when the electronic system 1500 is off. Some embodiments of the invention use a mass-storage device (such as a magnetic or optical disk and its corresponding disk drive, integrated flash memory) as the permanent storage device 1535.

Other embodiments use a removable storage device (such as a floppy disk, flash memory device, etc., and its corresponding drive) as the permanent storage device. Like the permanent storage device 1535, the system memory 1520 is a read-and-write memory device. However, unlike storage device 1535, the system memory 1520 is a volatile read-and-write memory, such a random access memory. The system memory 1520 stores some of the instructions and data that the processor needs at runtime. In some embodiments, the invention's processes are stored in the system memory 1520, the permanent storage device 1535, and/or the read-only memory 1530. For example, the various memory units include instructions for processing multimedia clips in accordance with some embodiments. From these various memory units, the processing unit(s) 1510 retrieves instructions to execute and data to process in order to execute the processes of some embodiments.

The bus 1505 also connects to the input and output devices 1540 and 1545. The input devices 1540 enable the user to communicate information and select commands to the electronic system. The input devices 1540 include alphanumeric keyboards and pointing devices (also called "cursor control devices"), cameras (e.g., webcams), microphones or similar devices for receiving voice commands, etc. The output devices 1545 display images generated by the electronic system or otherwise output data. The output devices 1545 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 15, bus 1505 also couples electronic system 1500 to a network 1525 through a network adapter (not shown). In this manner, the computer can be a part of a network of computers (such as a local area network ("LAN"), a wide area network ("WAN"), or an Intranet, or a network of networks, such as the Internet. Any or all components of electronic system 1500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

V. Map Service Environment

Figure 16:
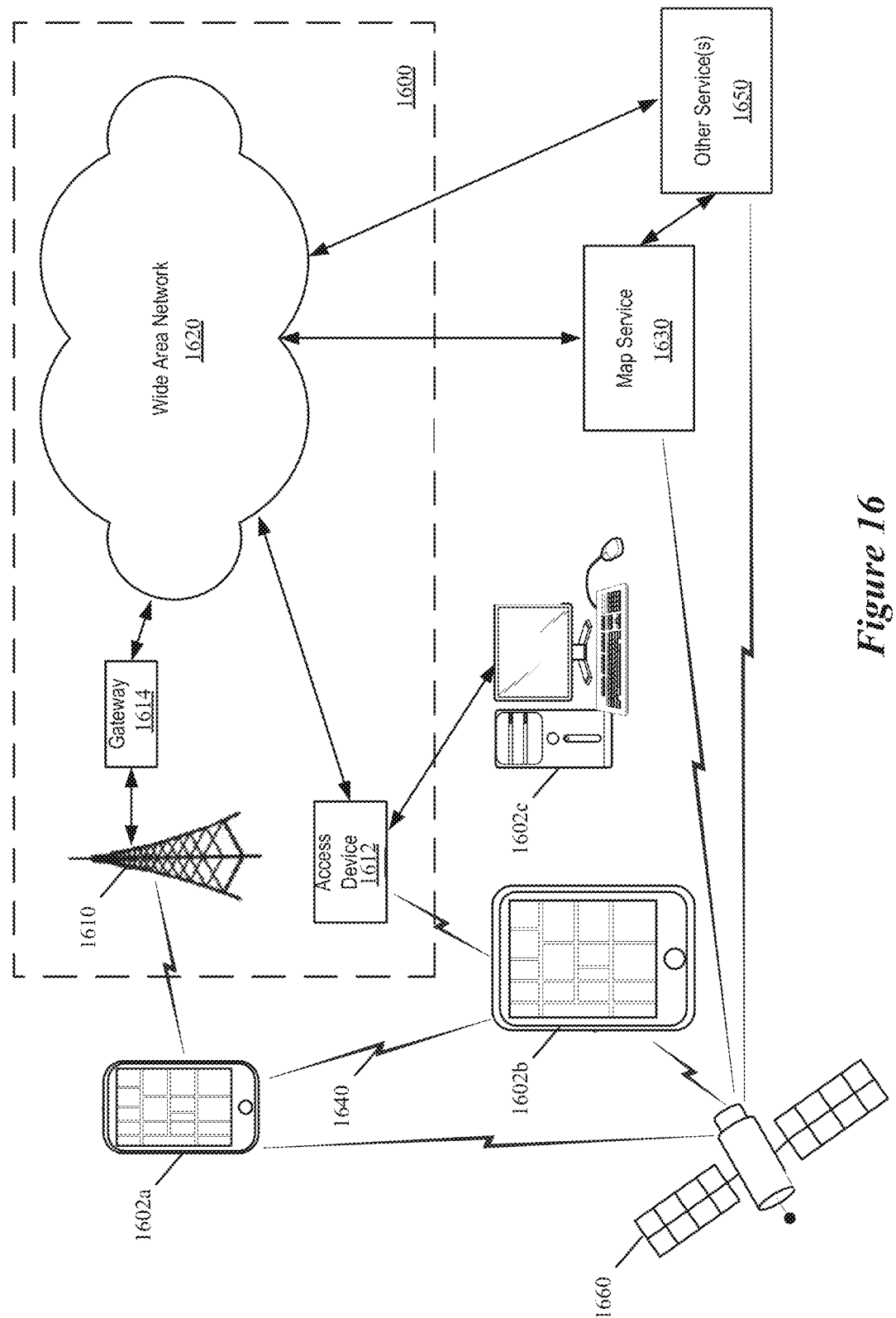
FIG. 16 illustrates a map service operating environment, according to some embodiments.

Various embodiments may operate within a map service operating environment. FIG. 16 illustrates a map service operating environment, according to some embodiments. A map service 1630 (also referred to as mapping service) may provide map services for one or more client devices 1602a-1602c in communication with the map service 1630 through various communication methods and protocols. A map service 1630 in some embodiments provides map information and other map-related data, such as two-dimensional map image data (e.g., aerial view of roads utilizing satellite imagery), three-dimensional map image data (e.g., traversable map with three-dimensional features, such as buildings), route and direction calculation (e.g., ferry route calculations or directions between two points for a pedestrian), real-time navigation data (e.g., turn-by-turn visual navigation data in two or three dimensions), location data (e.g., where is the client device currently located), and other geographic data (e.g., wireless network coverage, weather, traffic information, or nearby points-of-interest). In various embodiments, the map service data may include localized labels for different countries or regions; localized labels may be utilized to present map labels (e.g., street names, city names, points of interest) in different languages on client devices. Client devices 1602a-1602c may utilize these map services by obtaining map service data. Client devices 1602a-1602c may implement various techniques to process map service data. Client devices 1602a-1602c may then provide map services to various entities, including, but not limited to, users, internal software or hardware modules, and/or other systems or devices external to the client devices 1602a-1602c.

In some embodiments, a map service is implemented by one or more nodes in a distributed computing system. Each node may be assigned one or more services or components of a map service. Some nodes may be assigned the same map service or component of a map service. A load balancing node in some embodiments distributes access or requests to other nodes within a map service. In some embodiments a map service is implemented as a single system, such as a single server. Different modules or hardware devices within a server may implement one or more of the various services provided by a map service.

A map service in some embodiments provides map services by generating map service data in various formats. In some embodiments, one format of map service data is map image data. Map image data provides image data to a client device so that the client device may process the image data (e.g., rendering and/or displaying the image data as a two-dimensional or three-dimensional map). Map image data, whether in two or three dimensions, may specify one or more map tiles. A map tile may be a portion of a larger map image. Assembling together the map tiles of a map produces the original map. Tiles may be generated from map image data, routing or navigation data, or any other map service data. In some embodiments map tiles are raster-based map tiles, with tile sizes ranging from any size both larger and smaller than a commonly-used 256 pixel by 256 pixel tile. Raster-based map tiles may be encoded in any number of standard digital image representations including, but not limited to, Bitmap (.bmp), Graphics Interchange Format (.gif), Joint Photographic Experts Group (.jpg, .jpeg, etc.), Portable Networks Graphic (.png), or Tagged Image File Format (.tiff). In some embodiments, map tiles are vector-based map tiles, encoded using vector graphics, including, but not limited to, Scalable Vector Graphics (.svg) or a Drawing File (.drw). Some embodiments also include tiles with a combination of vector and raster data. Metadata or other information pertaining to the map tile may also be included within or along with a map tile, providing further map service data to a client device. In various embodiments, a map tile is encoded for transport utilizing various standards and/or protocols, some of which are described in examples below.

In various embodiments, map tiles may be constructed from image data of different resolutions depending on zoom level. For instance, for low zoom level (e.g., world or globe view), the resolution of map or image data need not be as high relative to the resolution at a high zoom level (e.g., city or street level). For example, when in a globe view, there may be no need to render street level artifacts as such objects would be so small as to be negligible in many cases.

A map service in some embodiments performs various techniques to analyze a map tile before encoding the tile for transport. This analysis may optimize map service performance for both client devices and a map service. In some embodiments, map tiles are analyzed for complexity, according to vector-based graphic techniques, and constructed utilizing complex and non-complex layers. Map tiles may also be analyzed for common image data or patterns that may be rendered as image textures and constructed by relying on image masks. In some embodiments, raster-based image data in a map tile contains certain mask values, which are associated with one or more textures. Some embodiments also analyze map tiles for specified features that may be associated with certain map styles that contain style identifiers.

Other map services generate map service data relying upon various data formats separate from a map tile in some embodiments. For instance, map services that provide location data may utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Embodiments may also receive or request data from client devices identifying device capabilities or attributes (e.g., hardware specifications or operating system version) or communication capabilities (e.g., device communication bandwidth as determined by wireless signal strength or wire or wireless network type).

A map service may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

Various embodiments of a map service may respond to client device requests for map services. These requests may be a request for a specific map or portion of a map. Some embodiments format requests for a map as requests for certain map tiles. In some embodiments, requests also supply the map service with starting locations (or current locations) and destination locations for a route calculation. A client device may also request map service rendering information, such as map textures or style sheets. In at least some embodiments, requests are also one of a series of requests implementing turn-by-turn navigation. Requests for other geographic data may include, but are not limited to, current location, wireless network coverage, weather, traffic information, or nearby points-of-interest.

A map service, in some embodiments, analyzes client device requests to optimize a device or map service operation. For instance, a map service may recognize that the location of a client device is in an area of poor communications (e.g., weak wireless signal) and send more map service data to supply a client device in the event of loss in communication or send instructions to utilize different client hardware (e.g., orientation sensors) or software (e.g., utilize wireless location services or Wi-Fi positioning instead of GPS-based services). In another example, a map service may analyze a client device request for vector-based map image data and determine that raster-based map data better optimizes the map image data according to the image's complexity. Embodiments of other map services may perform similar analysis on client device requests and as such the above examples are not intended to be limiting.

Various embodiments of client devices (e.g., client devices 1602a-1602c) are implemented on different portable-multifunction device types. Client devices 1602a-1602c utilize map service 1630 through various communication methods and protocols. In some embodiments, client devices 1602a-1602c obtain map service data from map service 1630. Client devices 1602a-1602c request or receive map service data. Client devices 1602a-1602c then process map service data (e.g., render and/or display the data) and may send the data to another software or hardware module on the device or to an external device or system.

A client device, according to some embodiments, implements techniques to render and/or display maps. These maps may be requested or received in various formats, such as map tiles described above. A client device may render a map in two-dimensional or three-dimensional views. Some embodiments of a client device display a rendered map and allow a user, system, or device providing input to manipulate a virtual camera in the map, changing the map display according to the virtual camera's position, orientation, and field-of-view. Various forms and input devices are implemented to manipulate a virtual camera. In some embodiments, touch input, through certain single or combination gestures (e.g., touch-and-hold or a swipe) manipulate the virtual camera. Other embodiments allow manipulation of the device's physical location to manipulate a virtual camera. For instance, a client device may be tilted up from its current position to manipulate the virtual camera to rotate up. In another example, a client device may be tilted forward from its current position to move the virtual camera forward.

Other input devices to the client device may be implemented including, but not limited to, auditory input (e.g., spoken words), a physical keyboard, mouse, and/or a joystick.

Some embodiments provide various visual feedback to virtual camera manipulations, such as displaying an animation of possible virtual camera manipulations when transitioning from two-dimensional map views to three-dimensional map views. Some embodiments also allow input to select a map feature or object (e.g., a building) and highlight the object, producing a blur effect that maintains the virtual camera's perception of three-dimensional space.

In some embodiments, a client device implements a navigation system (e.g., turn-by-turn navigation). A navigation system provides directions or route information, which may be displayed to a user. Some embodiments of a client device request directions or a route calculation from a map service. A client device may receive map image data and route data from a map service. In some embodiments, a client device implements a turn-by-turn navigation system, which provides real-time route and direction information based upon location information and route information received from a map service and/or other location system, such as Global Positioning Satellite (GPS). A client device may display map image data that reflects the current location of the client device and update the map image data in real-time. A navigation system may provide auditory or visual directions to follow a certain route.

A virtual camera is implemented to manipulate navigation map data according to some embodiments. Some embodiments of client devices allow the device to adjust the virtual camera display orientation to bias toward the route destination. Some embodiments also allow virtual camera to navigation turns simulating the inertial motion of the virtual camera.

Client devices implement various techniques to utilize map service data from map service. Some embodiments implement some techniques to optimize rendering of two-dimensional and three-dimensional map image data. In some embodiments, a client device locally stores rendering information. For instance, a client stores a style sheet which provides rendering directions for image data containing style identifiers. In another example, common image textures may be stored to decrease the amount of map image data transferred from a map service. Client devices in different embodiments implement various modeling techniques to render two-dimensional and three-dimensional map image data, examples of which include, but are not limited to: generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data. Some embodiments of client devices also order or prioritize map service data in certain techniques. For instance, a client device detects the motion or velocity of a virtual camera, which if exceeding certain threshold values, lower-detail image data is loaded and rendered of certain areas. Other examples include: rendering vector-based curves as a series of points, preloading map image data for areas of poor communication with a map service, adapting textures based on display zoom level, or rendering map image data according to complexity.

In some embodiments, client devices communicate utilizing various data formats separate from a map tile. For instance, some client devices implement Assisted Global Positioning Satellites (A-GPS) and communicate with location services that utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Client devices may also receive GPS signals directly. Embodiments may also send data, with or without solicitation from a map service, identifying the client device's capabilities or attributes (e.g., hardware specifications or operating system version) or communication capabilities (e.g., device communication bandwidth as determined by wireless signal strength or wire or wireless network type).

FIG. 16 illustrates one possible embodiment of an operating environment 1600 for a map service 1630 and client devices 1602a-1602c. In some embodiments, devices 1602a, 1602b, and 1602c communicate over one or more wire or wireless networks 1610. For example, wireless network 1610, such as a cellular network, can communicate with a wide area network (WAN) 1620, such as the Internet, by use of gateway 1614. A gateway 1614 in some embodiments provides a packet oriented mobile data service, such as General Packet Radio Service (GPRS), or other mobile data service allowing wireless networks to transmit data to other networks, such as wide area network 1620. Likewise, access device 1612 (e.g., IEEE 802.11g wireless access device) provides communication access to WAN 1620. Devices 1602a and 1602b can be any portable electronic or computing device capable of communicating with a map service. Device 1602c can be any non-portable electronic or computing device capable of communicating with a map service.

In some embodiments, both voice and data communications are established over wireless network 1610 and access device 1612. For instance, device 1602a can place and receive phone calls (e.g., using voice over Internet Protocol (VoIP) protocols), send and receive e-mail messages (e.g., using Simple Mail Transfer Protocol (SMTP) or Post Office Protocol 3 (POP3)), and retrieve electronic documents and/or streams, such as web pages, photographs, and videos, over wireless network 1610, gateway 1614, and WAN 1620 (e.g., using Transmission Control Protocol/Internet Protocol (TCP/IP) or User Datagram Protocol (UDP)). Likewise, in some implementations, devices 1602b and 1602c can place and receive phone calls, send and receive e-mail messages, and retrieve electronic documents over access device 1612 and WAN 1620. In various embodiments, any of the illustrated client device may communicate with map service 1630 and/or other service(s) 1650 using a persistent connection established in accordance with one or more security protocols, such as the Secure Sockets Layer (SSL) protocol or the Transport Layer Security (TLS) protocol.

Devices 1602a and 1602b can also establish communications by other means. For example, wireless device 1602a can communicate with other wireless devices (e.g., other devices 1602b, cell phones, etc.) over the wireless network 1610. Likewise devices 1602a and 1602b can establish peer-to-peer communications 1640 (e.g., a personal area network) by use of one or more communication subsystems, such as Bluetooth® communication from Bluetooth Special Interest Group, Inc. of Kirkland, Wash. Device 1602c can also establish peer to peer communications with devices 1602a or 1602b (not shown). Other communication protocols and topologies can also be implemented. Devices 1602a and 1602b may also receive Global Positioning Satellite (GPS) signals from GPS satellites 1660.

Devices 1602a, 1602b, and 1602c can communicate with map service 1630 over the one or more wire and/or wireless networks, 1610 or 1612. For instance, map service 1630 can provide a map service data to rendering devices 1602a, 1602b, and 1602c. Map service 1630 may also communicate with other services 1650 to obtain data to implement map services. Map service 1630 and other services 1650 may also receive GPS signals from GPS satellites 1660.

In various embodiments, map service 1630 and/or other service(s) 1650 are configured to process search requests from any of client devices. Search requests may include but are not limited to queries for business, address, residential locations, points of interest, or some combination thereof. Map service 1630 and/or other service(s) 1650 may be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria include but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 1630 and/or other service(s) 1650 are configured to provide auto-complete search results that are displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the Internet) by map service 1630 and/or other service(s) 1650, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device is configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 1630 and/or other service(s) 1650 provide one or more feedback mechanisms to receive feedback from client devices 1602a-1602c. For instance, client devices may provide feedback on search results to map service 1630 and/or other service(s) 1650 (e.g., feedback specifying ratings, reviews, temporary or permanent business closures, errors etc.); this feedback may be used to update information about points of interest in order to provide more accurate or more up-to-date search results in the future. In some embodiments, map service 1630 and/or other service(s) 1650 may provide testing information to the client device (e.g., an A/B test) to determine which search results are best. For instance, at random intervals, the client device may receive and present two search results to a user and allow the user to indicate the best result. The client device may report the test results to map service 1630 and/or other service(s) 1650 to improve future search results based on the chosen testing technique, such as an A/B test technique in which a baseline control sample is compared to a variety of single-variable test samples in order to improve results.

While the invention has been described with reference to numerous specific details, one of ordinary skill in the art will recognize that the invention can be embodied in other specific forms without departing from the spirit of the invention. For instance, many of the figures (e.g., FIGS. 3 and 4) illustrate various touch gestures (e.g., taps, double taps, swipe gestures, press and hold gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures conceptually illustrate processes (i.e., FIGS. 2 and 13). The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

What is claimed is:

1. A non-transitory machine readable medium storing a program for execution by at least one processing unit, the program comprising sets of instructions for:
    on a display screen, displaying a navigation presentation showing a route that is being navigated;
    identifying different junctions along the navigated route;
    displaying a plurality of navigation banners on the display screen, each navigation banner providing navigation instructions for a corresponding junction along the navigated route; and
    displaying a plurality of road signs on the display screen by:
        displaying a first set of road signs with a first appearance for roads on the navigated route, wherein a number of road signs in the displayed first set does not exceed a maximum threshold; and
        when the number of road signs in the displayed first set of road signs is below a minimum threshold, displaying a second set of road signs with a second appearance for at least a subset of roads that are not on the navigated route but intersect the roads on the navigated route.

2. The non-transitory machine readable medium of claim 1, wherein the set of instructions for displaying the plurality of road signs comprises a set of instructions for specifying a first color for the road signs displayed with the first appearance and a second different color for the road signs displayed with the second appearance.

3. The non-transitory machine readable medium of claim 1, wherein the set of instructions for displaying the plurality of road signs comprises a set of instructions for distributing the road signs on alternating sides about the navigated route.

4. The non-transitory machine readable medium of claim 1, wherein the program further comprises a set of instructions for categorizing roads on or near the navigated route into multiple different tiers, wherein the set of instructions for displaying the plurality of road signs comprises a set of instructions for using the categorized road tiers to identify road signs for roads along the navigated route to display.

5. The non-transitory machine readable medium of claim 4, wherein the set of instructions for categorizing the roads comprises a set of instructions for categorizing the roads on the navigated route as first tier roads.

6. The non-transitory machine readable medium of claim 5, wherein the set of instructions for identifying the different junctions comprises a set of instructions for identifying different junctions in the first tier roads.

7. The non-transitory machine readable medium of claim 5, wherein the set of instructions for categorizing the roads comprises a set of instructions for categorizing the roads that intersect with the navigated route as second tier roads.

8. A method for a navigation application that executes on a device, the method comprising:
    on a display screen, displaying a navigation presentation showing a route that is being navigated;
    identifying different junctions along the navigated route; and
    displaying a plurality of navigation banners on the display screen, each navigation banner providing navigation instructions for a corresponding junction along the navigated route; and
    displaying a plurality of road signs on the display screen by:
        displaying a first set of road signs with a first appearance for roads on the navigated route, wherein a number of road signs in the displayed first set does not exceed a maximum threshold; and
        when the number of road signs in the displayed first set of road signs is below a minimum threshold, displaying a second set of road signs with a second appearance for at least a subset of roads that are not on the navigated route but intersect the roads on the navigated route.

9. The method of claim 8, wherein displaying the plurality of road signs comprises specifying a first color for the road signs displayed with the first appearance and a second different color is specified for the road signs displayed with the second appearance.

10. The method of claim 8, wherein displaying the plurality of road signs comprises distributing the road signs on alternating sides about the navigated route.

11. The method of claim 8 further comprising categorizing roads on or near the navigated route into multiple different tiers, and
    wherein displaying the plurality of road signs comprises using the categorized road tiers to identify road signs for roads along the navigated route to display.

12. The method of claim 11, wherein categorizing the roads comprises categorizing the roads on the navigated route as first tier roads.

13. The method of claim 12, wherein identifying the different junctions comprises identifying different junctions in the first tier roads.

14. The method of claim 12, wherein categorizing the roads comprises categorizing the roads that intersect with the navigated route as second tier roads.

15. The method of claim 14, wherein categorizing the roads further comprises categorizing all roads that intersect or overlap with the second tier roads as third tier roads.

16. The method of claim 14, wherein categorizing the roads further comprises categorizing the roads as third tier roads when the roads are within a threshold distance of the navigated route or when the roads are reachable from the navigated route within a threshold time.

17. An electronic device comprising:
a set of processing units for executing sets of instructions; and
a non-transitory machine readable medium storing a program for execution by at least one of the processing units, the program comprising sets of instructions for:
on a display screen, displaying a navigation presentation showing a route that is being navigated;
identifying different junctions along the navigated route;
displaying a plurality of navigation banners on the display screen, each navigation banner providing navigation instructions for a corresponding junction along the navigated route; and
displaying a plurality of road signs on the display screen by:
displaying a set of road signs with a first appearance for roads on the navigated route, wherein a number of road signs in the displayed first set does not exceed a maximum threshold; and
when the number of road signs in the displayed first set of road signs is below a minimum threshold, displaying a second set of road signs with a second appearance for at least a subset of roads that are not on the navigated route but intersect the roads on the navigated route.

18. The electronic device of claim 17, wherein the set of instructions for displaying the plurality of road signs comprises a set of instructions for specifying a first color for the plurality of road signs displayed with the first appearance and a second different color for the road signs displayed with the second appearance.

19. The electronic device of claim 17, wherein the set of instructions for displaying the plurality of road signs comprises a set of instructions for distributing the road signs on alternating sides about the navigated route.

20. The electronic device of claim 17, wherein the program further comprises a set of instructions for categorizing roads on or near the navigated route into multiple different tiers, and
wherein the set of instructions for displaying the plurality of road signs comprises a set of instructions for using the categorized road tiers to identify road signs for roads along the navigated route to display.

21. The electronic device of claim 20, wherein the set of instructions for categorizing the roads comprises a set of instructions for categorizing the roads on the navigated route as first tier roads.

22. The electronic device of claim 21, wherein the set of instructions for identifying the different junctions comprises a set of instructions for identifying different junctions in the first tier roads.

23. The electronic device of claim 21, wherein the set of instructions for categorizing the roads further comprises a set of instructions for categorizing the roads that intersect with the navigated route as second tier roads.

24. The electronic device of claim 23, wherein the set of instructions for categorizing the roads further comprises a set of instructions for categorizing all roads that intersect or overlap with the second tier roads as third tier roads when the roads are within a threshold distance of the navigated route or when the roads are reachable from the navigated route within a threshold time.

* * * * *